United States Patent
Tanaka

(10) Patent No.: US 8,665,754 B2
(45) Date of Patent: Mar. 4, 2014

(54) PATH GENERATING METHOD, RELAY DEVICE, AND COMPUTER PRODUCT

(75) Inventor: Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 95 days.

(21) Appl. No.: 13/328,157

(22) Filed: Dec. 16, 2011

(65) Prior Publication Data

US 2012/0207164 A1  Aug. 16, 2012

(30) Foreign Application Priority Data

Feb. 10, 2011 (JP) ................................. 2011-027947

(51) Int. Cl.
  *H04L 12/28* (2006.01)
(52) U.S. Cl.
  USPC .......................................... 370/254; 370/392
(58) Field of Classification Search
  USPC .................. 370/252, 254, 255, 256, 392, 401
  See application file for complete search history.

(56) References Cited

U.S. PATENT DOCUMENTS

| 7,187,658 | B2 * | 3/2007 | Koyanagi et al. | 370/254 |
| 7,870,298 | B2 * | 1/2011 | Shima et al. | 709/250 |
| 8,018,872 | B2 * | 9/2011 | Strater et al. | 370/254 |
| 2007/0223478 | A1 | 9/2007 | Nishimura et al. | |
| 2009/0080431 | A1 * | 3/2009 | Rekhter | 370/392 |

FOREIGN PATENT DOCUMENTS

JP  2007-258955 A  10/2007

* cited by examiner

*Primary Examiner* — Hong Cho
(74) *Attorney, Agent, or Firm* — Fujitsu Patent Center

(57) ABSTRACT

On a network formed by multiple nodes, a shortest path is generated between an ingress node and an egress node. When a packet is transmitted from the ingress to the egress node, in addition to the packet being transmitted from the port to the shortest path, the packet is flooded from the other ports excluding the port to the shortest path, whereby nodes that are among the nodes forming the network and not on the shortest path automatically generate according to a conventional first-in, first-learned scheme, a path that is shortest in the network excluding the shortest path, i.e., a redundant path that shares no links or nodes with the shortest path. Therefore, the operator can automatically generate a redundant path by merely specifying the ingress node and the egress node.

19 Claims, 19 Drawing Sheets

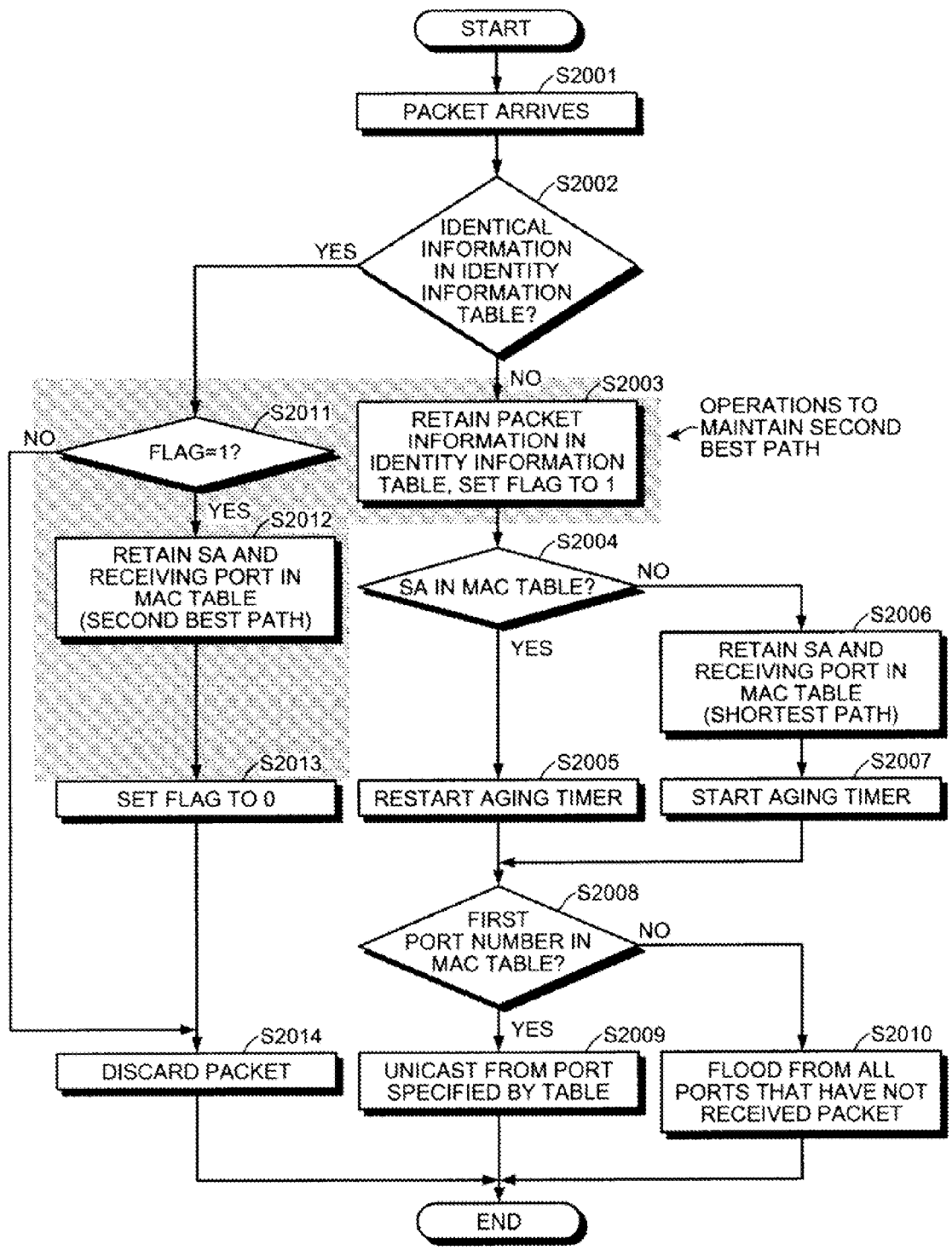

PATH GENERATING METHOD, RELAY DEVICE, AND COMPUTER PRODUCT

CROSS REFERENCE TO RELATED APPLICATIONS

This application is based upon and claims the benefit of priority of the prior Japanese Patent Application No. 2011-027947, filed on Feb. 10, 2011, the entire contents of which are incorporated herein by reference.

FIELD

The embodiment discussed herein is related to path generation.

BACKGROUND

Ethernet technology for wide area networks (WAN) such as metro area networks (MAN) has advanced remarkably accompanying the spread of Wide Area Ethernet (registered trademark) service.

In such networks, link and path redundancy exists and when a failure occurs, by switching to backup links/paths, communication can continue even if a link is lost or trouble at a relay device (hereinafter, "node") occurs.

For example, when the prescribed spanning tree protocol (STP) or the rapid spanning tree protocol (RSTP), which is an expansion of the STP, is used as an Ethernet (registered trademark) network redundancy scheme, a tree is configured and corrected, enabling failure recovery (see, for example, Japanese Laid-Open Patent Publication No. 2007-258955).

Further, in recent years, Ethernet (registered trademark) network redundancy schemes have been standardized by ITU-T and 1+1 path protection has been prescribed. For example, when a 1+1 path protection scheme is used, an active path and a backup path, which share no links/nodes, are set between a start node and a terminal node. At the start node, packets are transmitted to both paths and at the terminal node, packets that are from the active path are selected. Thus, if failure occurs on the active path, high speed failure recovery is possible by switching to the use of the packets from the backup path.

Nonetheless, when the STP is used, a problem arises in that the configuration and correction of the tree takes time and the switch to the redundant path takes considerable time. Although RSTP resolves the shortcomings of the STP to a certain extent, depending on the location of failure, the switching of paths can take considerable time, like under the STP.

When a 1+1 path protection scheme is used, although high speed failure recovery is possible, operation so that the active path and the backup path do not share links/nodes is costly.

SUMMARY

According to an aspect of an embodiment, a path generating method includes a first operation by a first terminal relay device and of transmitting an outbound packet from a given port among ports of a first terminal relay device of a path that is from a first device to a second device and flooding the outbound packet from the ports excluding the given port and a receiving port, wherein the first terminal relay device is among relay devices forming a network in which the path is set according to a first-in, first-learned scheme, the given port is a port specified by the first-in, first-learned scheme, the receiving port is the port that has received the outbound packet, which is a packet whose source is the first device and whose destination is the second device; a second operation of learning and flooding by a relay device that is among the relay devices and not on the path, wherein the relay device learns according to the first-in, first-learned scheme, the source of a first-arriving outbound packet that is first to arrive among the outbound packets flooded to the relay device and further learns the port number of the receiving port that received the first-arriving outbound packet, and floods the outbound packet from the ports excluding the receiving port; and a third operation of transmitting and learning by a second terminal relay device that is on the path and among the relay devices, wherein from a port of a port number of the second relay device learned according to the first-in, first-learned scheme, the second terminal relay device transmits to the second device, the outbound packet received from a relay device on the path and learns the source of the first-arriving outbound packet among the outbound packets flooded to the second terminal relay device and further learns the port number of the receiving port that received the first-arriving outbound packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a flowchart of path generation processes of an egress node.

DESCRIPTION OF EMBODIMENTS

Preferred embodiments of the present invention will be explained with reference to the accompanying drawings.

FIGS. 1A, 1B, 1C, 2A, are 2B are diagrams of second best path generation by a node. FIGS. 1A to 2B depict a network configured by multiple nodes 100. In this example, the network is configured by 9 nodes 100 (nodes A-I). Node A is set as the start node (ingress node) and node I is set as the terminal node (egress node) by an operator.

In the network, the shortest path between the ingress node (node A) and the egress node (node I) is generated by a conventional scheme of first-in, first-learned. In this example, the shortest path is assumed to pass through node A, node B, node D, node G, and node I.

With the shortest path having been generated in this manner, the ingress node (node A) and the egress node (node I) perform processes to generate a second best path as a redundant path in addition to the best path. Meanwhile, nodes B-H perform processing according the conventional scheme of first-in, first-learned. Here, the second best path is a (node disjoint/link disjoint) path that shares no nodes or links with the best path and that in the network exclusive of the best path, becomes the shortest path.

Although detailed description will not be given since first-in, first-learned is a conventional technique, under the scheme, when a node 100 receives the same packet from multiple ports, the node 100 correlates and stores the port number of the port that received the packet first and the transmission source of the packet. The node 100 floods the packet from other ports and further discards the second and subsequent packets.

For example, when the node 100 receives a group of the same packet from a group of ports, the node 100 extracts the packet that among the group of packets, arrived first (hereinafter, "first packet") from the transmission source. Here, the path through which the first packet from the transmission source passed is, in other words, the path (the shortest path) that can reach the transmission source, which is set as the destination, fastest.

Accordingly, the node 100 stores the port number of the port that received the first packet, as the port number of the port that corresponds to the shortest path from the node 100 to the transmission source of the first packet. Thereafter, the node 100 floods the first packet and discards the second and subsequently arriving packets (hereinafter, "subsequent packets"). The other nodes 100 also similarly store the port number corresponding to the shortest path, whereby the shortest paths from the nodes 100 to the transmission source are generated automatically.

Under the first-in, first-learned scheme, until the elapse of a given period that starts from the recording of the port number corresponding to the shortest path, the nodes 100 do not overwrite the port numbers, thereby ensuring the stability of the shortest paths.

Figure 1A:
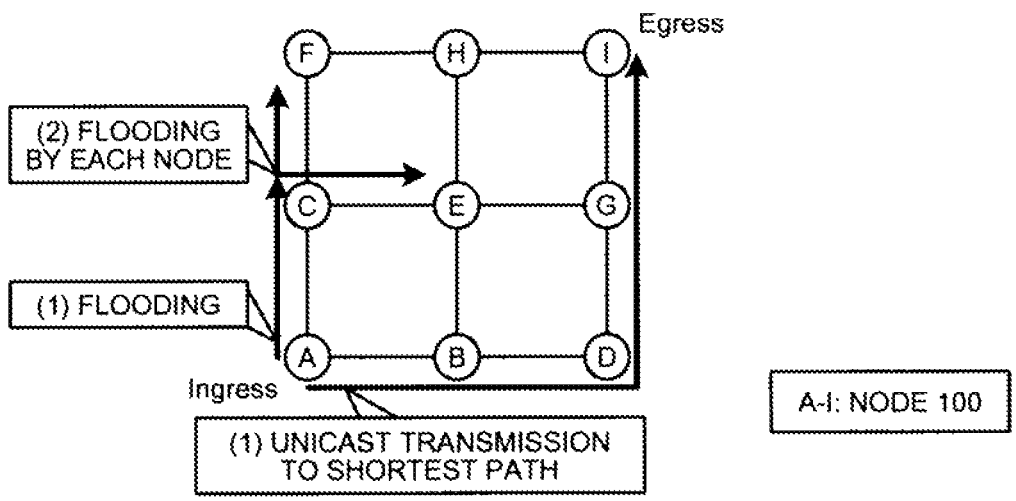
FIGS. 1A, 1B, 1C, 2A, and 2B are diagrams of second best path generation by a node.

In this example, as depicted in FIG. 1A, the ingress node (node A) according to the present embodiment (1) unicasts the packet from the port of the known shortest path and floods (simultaneously transmits) the packet from all other ports excluding the port of the shortest path. The packet transmitted to the shortest path passes through the shortest path and reaches the egress node (node I). Meanwhile, the packets flooded by node A (2) are flooded by the receiving nodes 100, from all ports excluding the port of input, according to the conventional first-in, first-learned scheme. For example, at node C, the packet is flooded from the ports to nodes E and F.

Figure 1B:
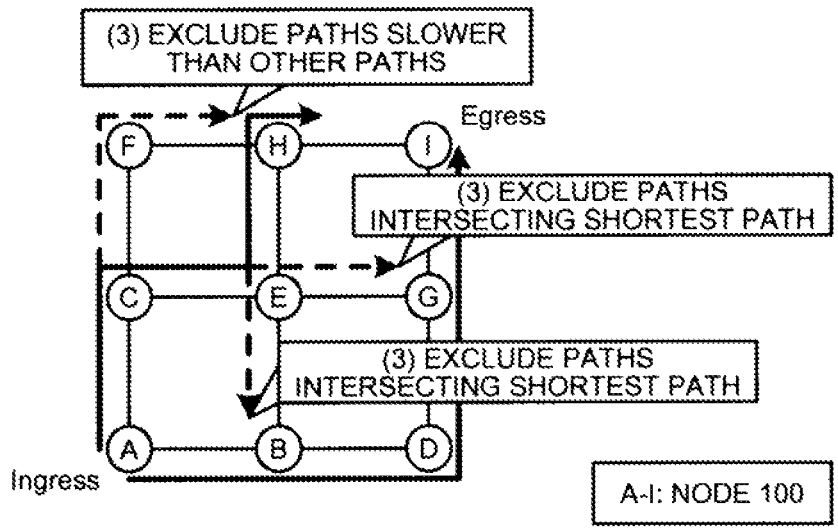

In this manner, each of the nodes 100 floods the received packet and as depicted in FIG. 1B, the packet is transmitted. Here, according to the conventional first-in, first-learned scheme, nodes B-H learn the first port as the port number, whereby nodes 100 forming the shortest path store the port number of the port to the shortest path and the remaining nodes 100 store the port number of the shortest path (the second best path) to node A in the network exclusive of the shortest path. In other words, a unidirectional, second best path to node A is generated.

For example, at node B, (3) the port to the shortest path has been learned as the first port and the port from node E is not learned as the first port. In other words, a path intersecting the shortest path is excluded from being the second best path. Similarly, at node G, (3) the port to the shortest has been learned as the first port and the port from node E is not learned as the first port. In other words, a path intersecting the shortest path is excluded from being the second best path. Further, for example, at node H, (3) the port from node E has been learned as the first port and the port from node F is not learned as the first port. In other words, in the network exclusive of the shortest path, paths having greater delay than other paths are excluded from being the second best path.

Figure 1C:
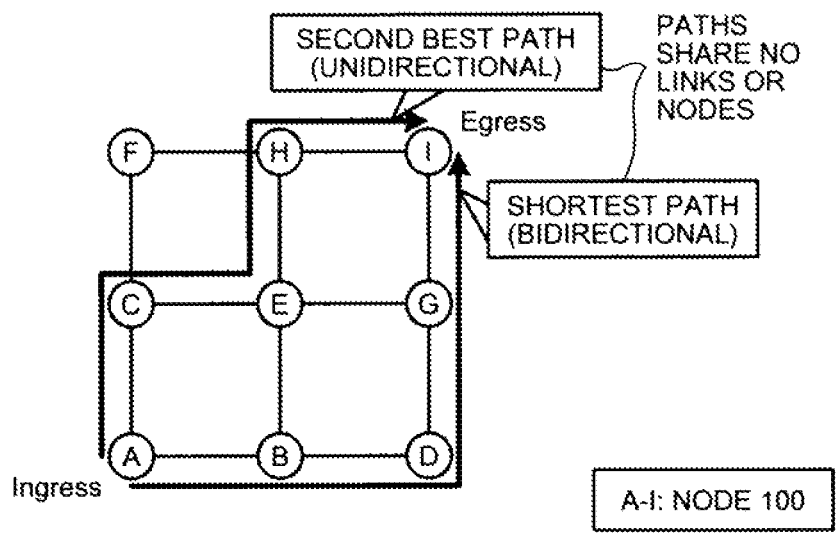

The egress node (node I) according to the present embodiment learns, as the port to the second best path, the port (hereinafter, "second port") that has received the packet (hereinafter, "second packet") arriving next after the first packet. In this manner, as depicted in FIG. 1C, node C, node E, node H, and node I forming the second best path can learn the port of the second best path to node A and consequently, a unidirectional, second best path from node I to node A can be generated. Furthermore, this second best path is a path that shares no links or nodes with the shortest path.

Figure 2A:
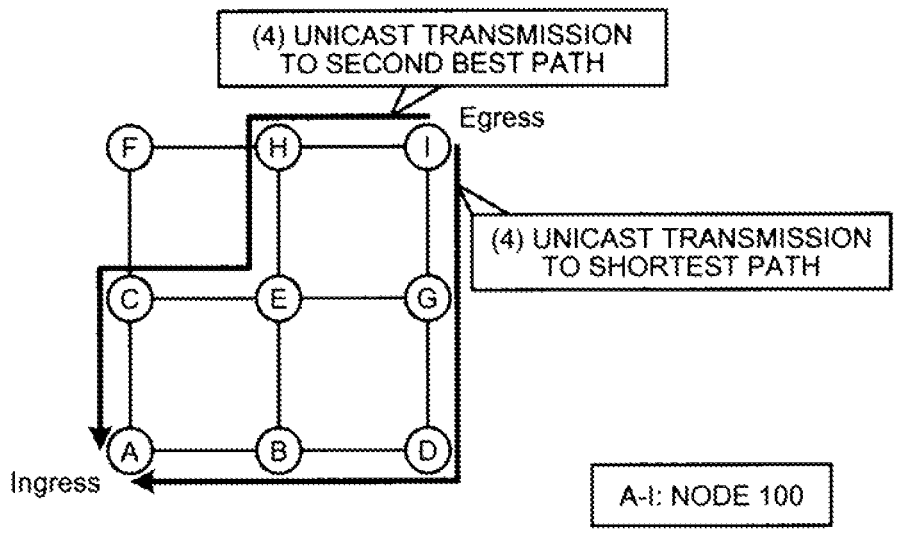

As depicted in FIG. 2A, the egress node (node I) according to the present embodiment (4) unicasts the packet from the port of the shortest path and from the port of the second best path. The packet transmitted to the shortest path passes through the shortest path and reaches the ingress node (node A); and the packet transmitted to the port of the second best path passes through the second best path and reaches the ingress node (node A).

Figure 2B:
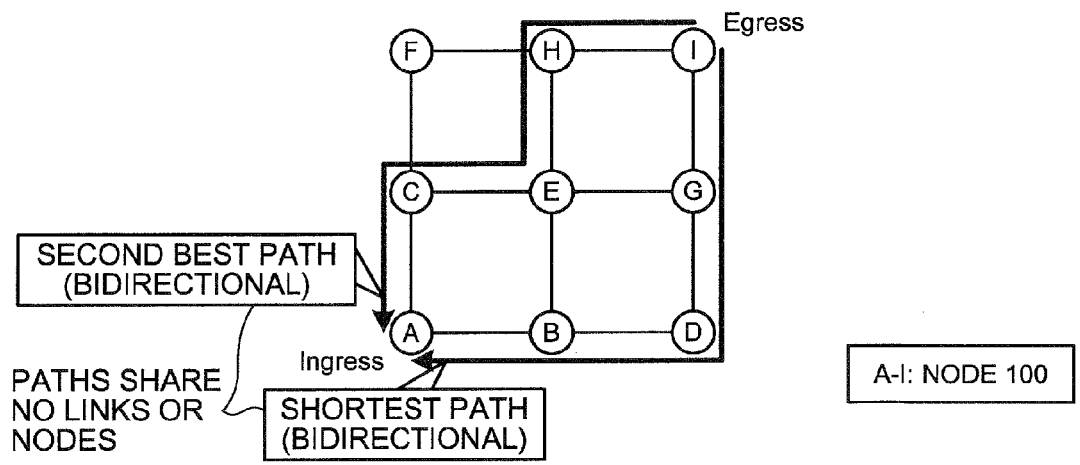

Here, each node 100 forming the second best path can learn the port of the second best path to node I, whereby a unidirectional, second best path from node A to node I is generated. In this manner, as depicted in FIG. 2B, a bidirectional second best path is generated.

In this manner, the nodes 100 clip paths to generate the shortest path and the second best path. After generation, at the ingress node, packets are transmitted to both the shortest path and the second best path; and at the egress node, among the packets transmitted by the shortest path and the second best path, the packet first to arrive is stored and the subsequent packets are discarded. The second best path and the shortest path share no nodes or links and therefore, even if failure occurs along the shortest path, packets received from the second best path can be transmitted to the transmission destination, without packet loss (without interruption).

Figure 3:
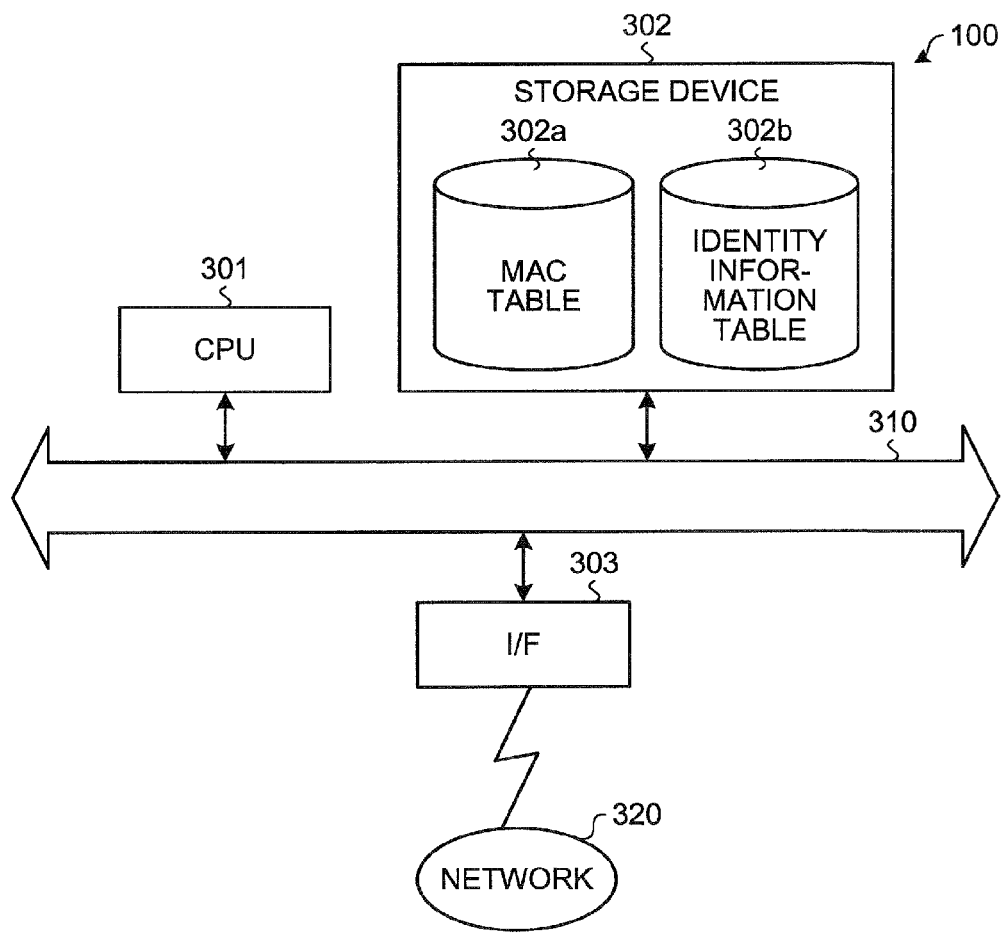
FIG. 3 is a block diagram of a hardware configuration of the node.

FIG. 3 is a block diagram of a hardware configuration of a node. As depicted in FIG. 3, the node 100 includes a central processing unit (CPU) 301, a storage device 302, and an interface (I/F) 303, respectively connected by a bus 310.

The CPU 301 governs overall control of the node 100. The storage device 302 stores a redundant path generating program as well as a MAC table 302a and an identity information table 302b. Nonvolatile memory, flash memory, a hard disk drive, etc. can be adopted as the storage device 302.

The I/F 303 is connected to a network 320 such as a local area network (LAN), a wide area network (WAN), and the Internet, through a communication line and is further connected to other devices via the network 320. The I/F 303 administers an internal interface with the network 320 and controls the input and output of data with respect to external devices. A modem, LAN adapter, etc. can be adopted as the I/F 303.

Figure 4:
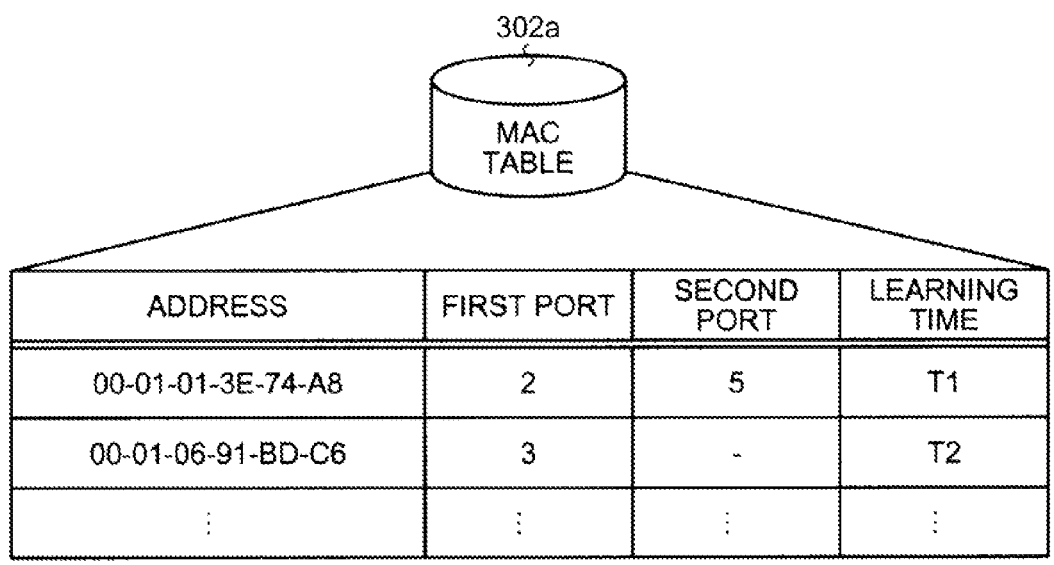
FIG. 4 is a diagram depicting the contents of a MAC table.

FIG. 4 is a diagram depicting the contents of the MAC table. As depicted in FIG. 4, the MAC table 302a includes an address field, a first port field, a second port field, and a learning time field.

The address field stores the destination MAC address, which uniquely identifies the destination of a packet. A MAC address in the case of Ethernet (registered trademark) is a 48-bit (EUI-48) code. The first port field stores the port number (hereinafter, "first port number") of the port that received the first packet. The first packet is the packet that arrives first at the node 100, among the packets flooded by the other nodes 100. The second port field stores the port number (hereinafter, "second port number") of the port that received the second packet. The second packet is the packet arriving, at the node 100, next after the first packet, among the packets flooded by the other nodes 100. The learning time field stores the time at which the first packet is received.

In the MAC table 302a, the stored contents are maintained by updating and therefore, records that have not been updated for a given period are deleted. The timer measuring this given period is called an aging timer.

Figure 5:
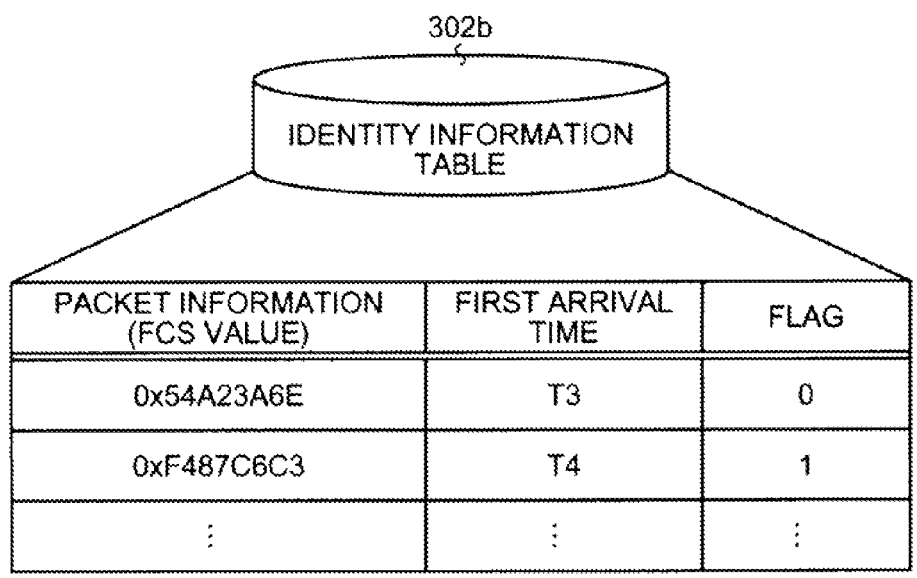
FIG. 5 is a diagram depicting the contents of an identity information table.

FIG. 5 is a diagram depicting the contents of the identity information table. As depicted in FIG. 5, the identity information table 302b has a packet information (FCS value) field, a first arrival time field, and a flag field.

The packet information field stores a packet frame check sequence (FCS) value (hereinafter, "packet information") used for judging whether a received packet is the first packet or a subsequent packet. For example, when an FCS value identical to the FCS value of the received packet is not stored in the identity information table 302b, the received packet is judged to be the first packet. Further, when an FCS value identical to the FCS value of the received packet is stored in the identity information table 302b, the received packet is judged to be a subsequent packet.

Here, an FCS value is a 32-bit field appended for transmission error detection of frames in Ethernet (registered trademark). The FCS value refers to a cyclic redundancy code (CRC) value obtained by a generator polynomial. In other words, this FCS value is a value derived from the packet and represents the packet overall. Therefore, by storing the FCS values to the identity information table 302b and using the FCS values in determining identicalness, whether packets are identical can be determined using hash values without calculating the hash values using a hash function. When FCS values are used for determining identity, the false recognition rate is approximately 1/4.3 billion.

Although, here, the packet information field is assumed to store the FCS values of packets, for example, the packet information field may store the packets themselves or a given portion thereof. The given portion of a packet may be, for example, the transmission source MAC address or the destination MAC address, or a combination of thereof. The packet information field may store the packets themselves or the hash value of a given portion of each packet. Furthermore, hash values from a hash function may be adopted.

The first arrival time field stores the time at which packet information is stored. The flag field stores flags that in combination with the FCS value of packets, identifies the sequence in which packets arrive. For example, when a first packet FCS value identical to the FCS value of a received packet is stored in the identity information table 302b and the flag is "1", the received packet is identified to be a second packet. Further, when a first packet FCS value identical to the FCS value of a received packet is stored in the identity information table 302b and the flag is "0", the received packet is identified to be a third or subsequent packet.

Figure 6:
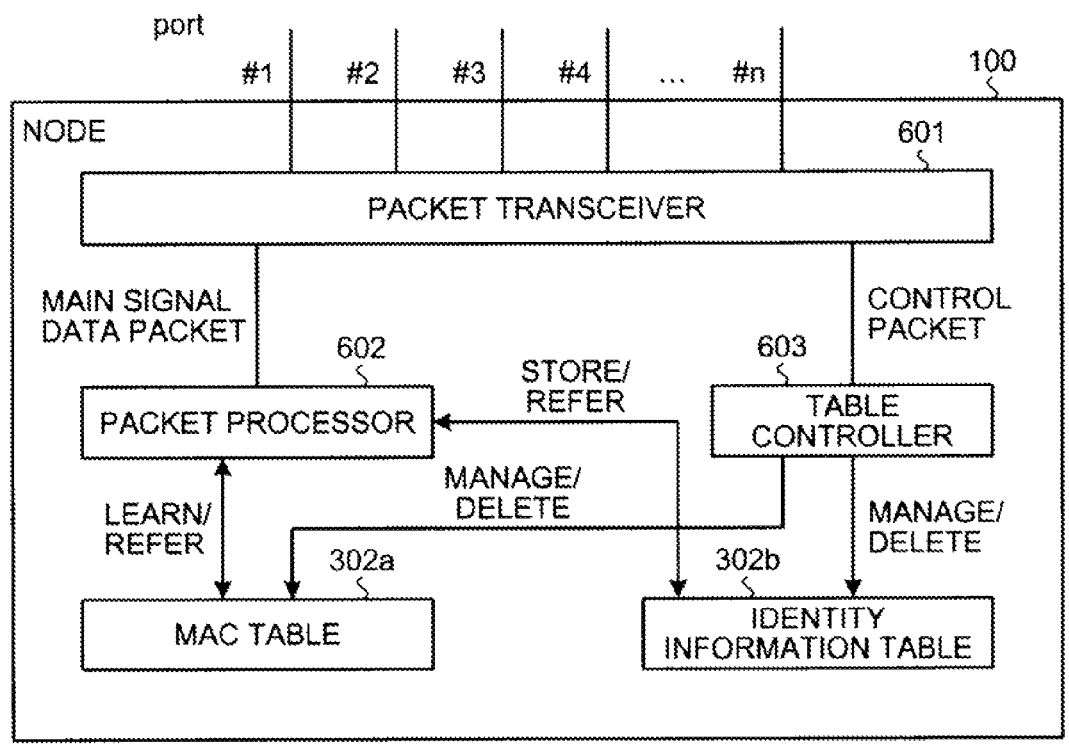
FIG. 6 is a block diagram of a functional configuration of the node.

FIG. 6 is a block diagram of a functional configuration of the node. As depicted in FIG. 6, the node 100 has N ports and includes a packet transceiver 601, a packet processor 602, a table controller 603, the MAC table 302a, and the identity information table 302b. Process results obtained by the functions (the packet transceiver 601-the table controller 603) are, for example, stored to the storage device 302, unless specified otherwise.

When the node 100 operates as the ingress node or the egress node, the packet transceiver 601 has a function of receiving a packet. For example, the packet transceiver 601 receives a packet from a port. Further, when the node 100 operates as the ingress node or the egress node, the packet transceiver 601 has a function of receiving a series of packets. For example, the packet transceiver 601 receives a packet from multiple ports, respectively. As a result, the packet transceiver 601 receives packets and can generate the MAC table 302a and the identity information table 302b.

Here, a function of the packet transceiver 601 when the node 100 operates as the ingress node will be described. The packet transceiver 601 has a function of simultaneously transmitting a packet from ports (exclusive of the port that received the packet) of the relay device of the node 100, upon determining that a specified port number is stored in a table. Here, the table is the MAC table 302a. The specified port number is the port number of the port to the shortest path.

For example, the packet processor 602 described hereinafter determines whether the port number of the port to the shortest path is stored in the MAC table 302a. If the port number is stored therein, the packet transceiver 601 replicates the received packet and floods the packet from the ports (exclusive of the port that received the packet) of the node 100.

For example, assuming a given node 100 has 8 ports (ports p1-p8), where port p1 is the specified port and port p2 is the port that has received the packet, the packet is flooded from ports p1, p3-p8.

When the ports (ports p1-p8) are logically partitioned as ports p1-p4 and ports p5-p8 by a virtual LAN (VLAN), flooding is performed from ports p1, p3, and p4. Since ports p5-p8 are not part of the same VLAN as ports p1 and p2, flooding is not performed from ports p5-p8.

Thus, the other nodes 100 can generate a second best path that does not share any links or nodes with the shortest path.

Here, a function of the packet transceiver 601 when the node 100 operates as the ingress node will be described. Upon judging that the specified port number is stored in the table, the packet transceiver 601 transmits a packet from the port of the specified port number. The packet transceiver 601 has a function of simultaneously transmitting a packet from ports exclusive of the port that received the packet and the port of the specified port number, after a given period has elapsed since the packet is transmitted from the port of the specified port number. For example, when the port number of the port to the shortest path is stored in the MAC table 302a, the packet transceiver 601 replicates the received packet and transmits the packet from the port of the shortest path.

After a given period elapses since the transmission to the shortest path, the packet transceiver 601 replicates the received packet and floods the packet from the ports of the node 100, exclusive of the port that received the packet and the port to the shortest path.

For example, assuming a given node 100 has 8 ports (ports p1-p8), where port p1 is the specified port and port p2 is the port that has received the packet, the packet is flooded from ports p3-p8.

When the ports (ports p1-p8) are logically partitioned as ports p1-p4 and ports p5-p8 by a VLAN, flooding is performed from ports p3 and p4. Since ports p5-p8 are not part of the same VLAN as ports p1 and p2, flooding is not performed from ports p5-p8.

Thus, even when the packet transmitted to the shortest path is delayed, the other nodes 100 can generate a second best path that does not share any links or nodes with the shortest path.

Here, a function of the packet transceiver 601 when the node 100 operates as the egress node will be described. The packet transceiver 601 has a function of transmitting based on the table and from the port that received the packet first to arrive and from the port that received a packet subsequently arriving and judged to be the second packet, a packet addressed to the transmission source of the packet first to arrive and of the subsequently arriving packet judged to be the second packet. Here, the packet first to arrive is the first packet described above, and the packet subsequently arriving and judged to be the second packet is the second packet described above.

The destination is the packet destination and is expressed as the destination MAC address. The transmission source is the transmission source of the packet and is expressed as the transmission-source MAC address. For example, the packet transceiver 601 transmits a packet from 2 ports, the port to the shortest path and the port to the second best path, based on the MAC table 302a. As a result, since the same packet can be transmitted to the destination by way of 2 paths, the packet can be delivered to the destination, even if failure occurs along either path.

Here, a function of the packet transceiver 601 when the node 100 operates as the egress node will be described. When a packet that has as a transmission source, a destination that is stored in the table, is received from 2 ports that correspond to the destination, the packet transceiver 601 has a function of transmitting only the packet first to arrive among packets received from the 2 ports. Here, the 2 ports corresponding to the destination are the port to the shortest path and the port to the second best path described above.

For example, when receiving packets respectively from the ports (stored in the MAC table 302a) to the shortest path and the second best path, the packet transceiver 601 transmits the first packet to the packet destination irrespective of which path the first packet passed, and discards the other packet. As a result, even if failure occurs along one of the paths, the packet transceiver 601 can receive the packet from the other path.

Functions of the packet transceiver 601, for example, are implemented by the I/F 303 and by executing on the CPU 301, a path generating program that is stored in the storage device 302 depicted in FIG. 3.

Here, a function of the packet processor 602 when the node 100 operates as the ingress node will be described. The packet processor 602 has a function of judging whether a specified port number that corresponds to the destination in the packet is stored in a table storing the port numbers of ports corresponding to each destination. For example, the packet processor 602 judges whether the port number corresponding to the destination MAC address in the packet received by the packet transceiver 601 is stored in the MAC table 302a. As a result, judgment of whether the port number of the port to the shortest path is stored in the MAC table 302a can be performed.

Here, a function of the packet processor 602 when the node 100 operates as the ingress node or the egress node will be described. The packet processor 602, when receiving a series of packets, has an identicalness judging function of judging whether among the series of packets, the first packet and a subsequent packet received from a port other than the port that received the first packet are identical. For example, the packet processor 602 judges whether an FCS value identical to the FCS value of the received packet is stored in the identity information table 302b and judges a received packet that is not stored, to be the first packet.

On the other hand, the packet processor 602 judges a packet for which an identical FCS value is stored in the identity information table 302b to be the second or subsequent packet.

As a result, the packet processor 602 can identify from among a series of packets, the first packet, the second packet, and a subsequent packet.

Here, a function of the packet processor 602 when the node 100 operates as the egress node will be described. The packet processor 602 has a sequence judging function of judging whether a subsequent packet is the second packet after the first packet. For example, when judging based on the identity information table 302b, that the packet is the second or subsequent packet, the packet processor 602 can further judge based on the identity information table 302b, whether the received packet is the second packet or the third packet. As a result, the packet processor 602 can determine the second packet and identify the port to the second best path.

Functions of the packet processor 602, for example, are implemented by executing on the CPU 301, the path generating program stored in the storage device 302 depicted in FIG. 3.

Here, a function of the table controller 603 when the node 100 operates as the ingress node will be described. The table controller 603 has a function of correlating and storing to a table, the port number of the port that received a subsequent packet judged to be identical to the first packet by the identicalness judging function and the transmission source of a subsequent packet (the transmission source becoming a destination). For example, the table controller 603 correlates and stores to the MAC table 302a as a record, the port number of the port that received a subsequent packet and the transmission source MAC address of the second packet. As a result, the table controller 603 can store to the MAC table 302a, the port number of the port to the second best path, based on the port number of the port that received a subsequent packet, without determining the sequence of packet arrival.

Here, a function of the table controller 603 when the node 100 operates as the egress node will be described. The table controller 603 has a function of correlating and storing to a table that stores the port numbers of ports corresponding to each destination, the port number of a port that has received a subsequent packet that has been judged to be identical by the identicalness judging function and that has been judged to be the second packet by the sequence judging function, and the transmission source of the subsequent packet judged to be the second packet (the transmission source becoming a destination).

For example, the table controller 603 correlates and stores to the MAC table 302a as a record, the port number of the port that received the second packet and the transmission source MAC address of the second packet. As a result, the table controller 603 can store to the MAC table 302a, the port number of the port to the second best path, based on the port number of the port that received the second packet.

Functions of the table controller 603, for example, are implemented by the storage device 302 and by executing on the CPU 301, the path generating program stored in the storage device 302 depicted in FIG. 3.

FIGS. 7, 8, 9, 10, 11, 12, 13, 14, 15, 16, and 17 are diagrams depicting an example of generation of the second best path. Here, FIGS. 7 to 17 depict a network formed by nodes A-I. Further, port number "0" of node A is connected to a device 701 having MAC address "xxx", and port number "25" of node I is connected to a device 702 having MAC address "yyy". In the drawings hereinafter, port number "0", the device 701 having MAC address "xxx", port number "25", and the device 702 having MAC address "yyy" are omitted for simplicity.

Figure 7:
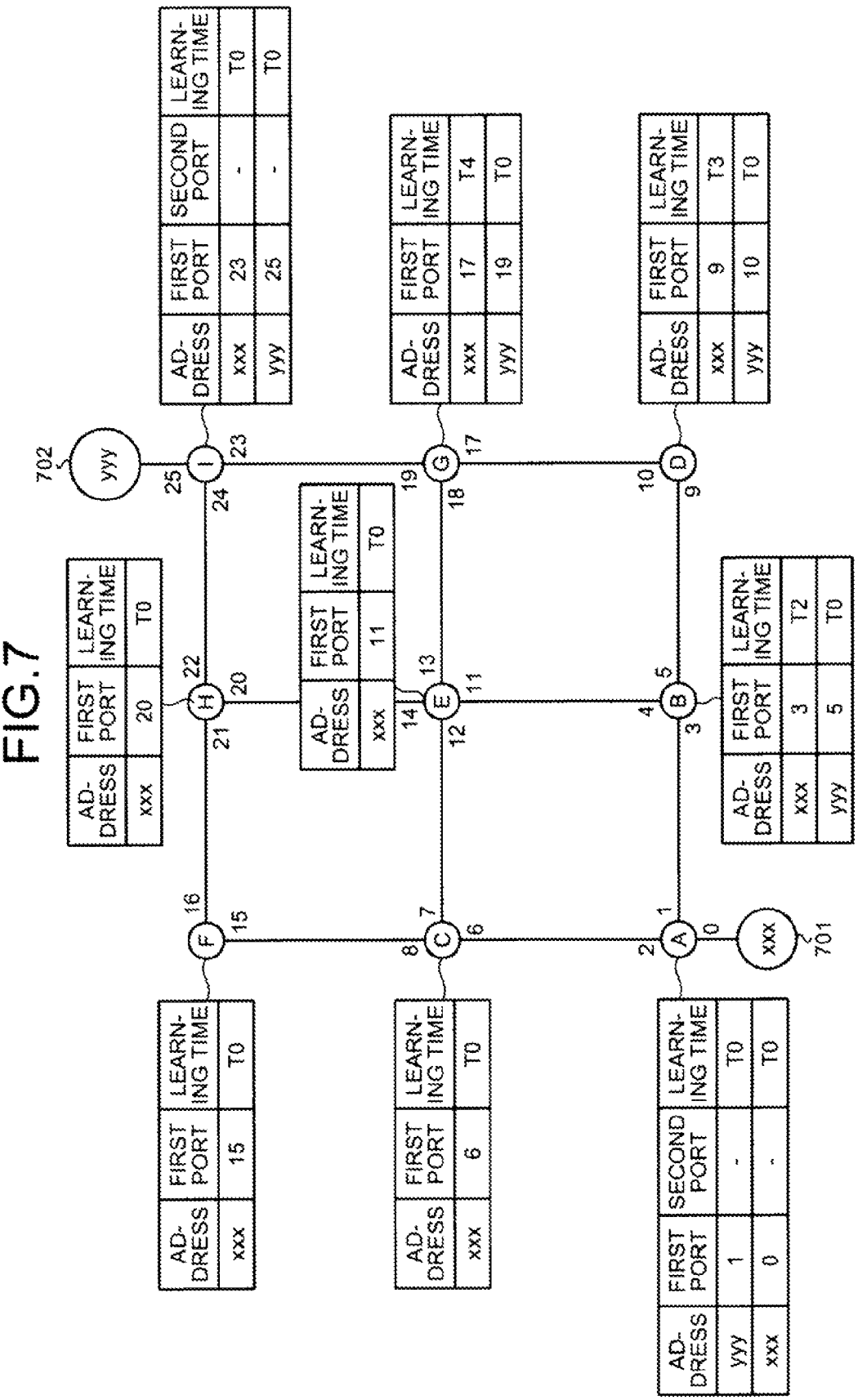
FIGS. 7, 8, 9, 10, 11, 12, 13, 14, 15, 16, and 17 are diagrams depicting an example of generation of the second best path.

As depicted in FIG. 7, in the network, the shortest path between MAC address "xxx" and MAC address "yyy" is generated by a conventional scheme of first-in, first-learned. In this example, the shortest path is assumed to pass through node A, node B, node D, node G, and node I. Further, each of the nodes 100 forming the shortest path store in a table, the port numbers of the ports used when packets are transmitted to MAC address "xxx" and MAC address "yyy". On the other hand, node C, node E, node F, and node H, which are not included in the shortest path, do not store the port numbers of the ports used when packets are transmitted to MAC address "yyy".

With the shortest path having been generated in this manner, the ingress node and the egress node according to the embodiment generate the second best path. Here, the nodes 100 that are the ingress node and the egress node are assumed to be node A and node I. Nodes other than the ingress node and the egress node perform processes according to a conventional first-in, first-learned scheme.

Figure 8:
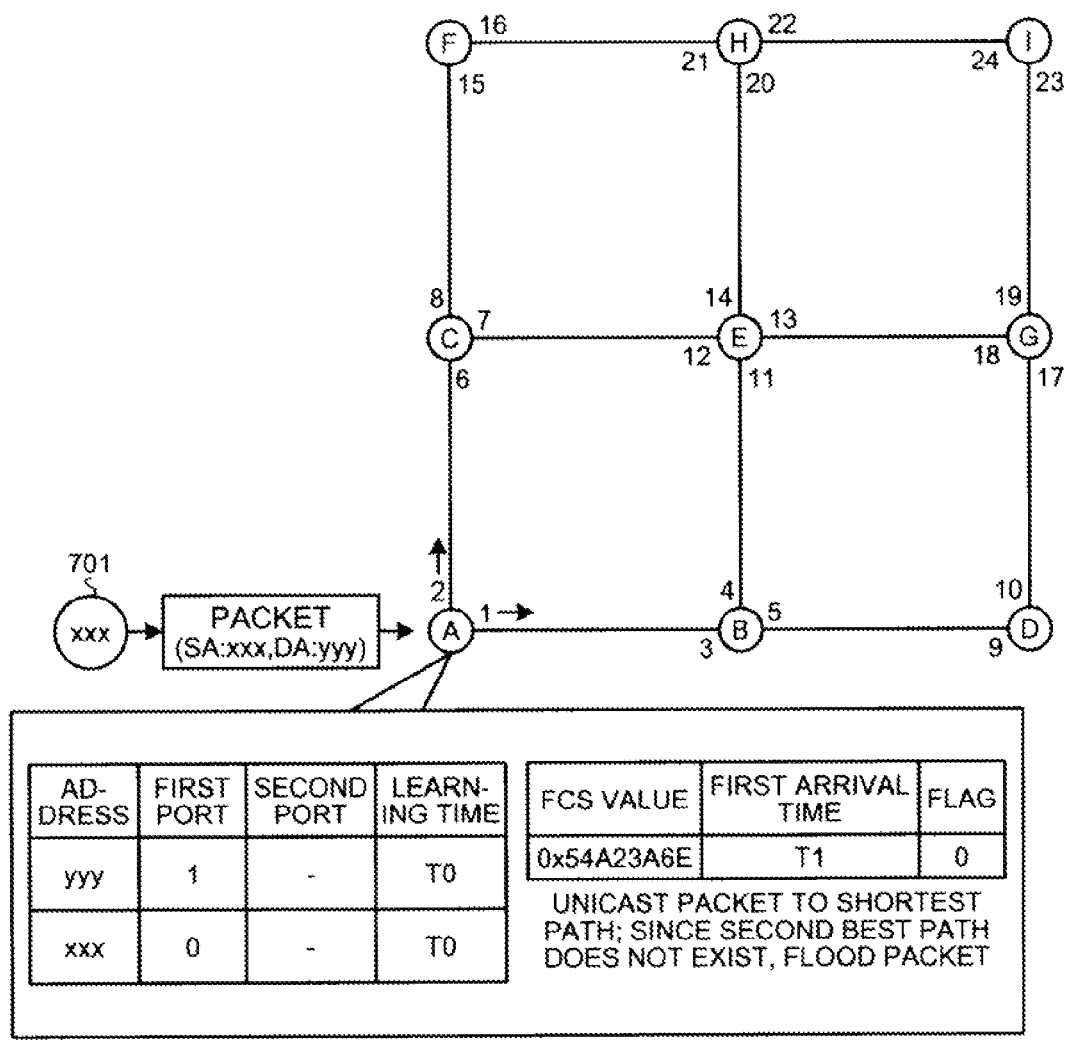

As depicted in FIG. 8, a packet whose transmission source MAC address (Source Address (SA)) is "xxx" and whose destination MAC address (Destination Address (DA)) is "yyy" is assumed to be transmitted to node A. Upon receiving the packet, node A stores packet information to the identity information table 302b, according to the ingress node processes of the embodiment and since SA "xxx" is stored in the MAC table 302a, restarts the aging timer.

Since first port number "1" corresponding to DA "yyy" is stored in the MAC table 302a, node A unicasts the packet from port number "1". The unicast packet traverses the shortest path toward DA "yyy". On the other hand, since the second port number corresponding to DA "yyy" is not stored in the MAC table 302a, node A floods the packet from all of the ports excluding the input port and the first port. As a result, in the network exclusive of the shortest path, the second best path proceeds to be generated.

Figure 9:
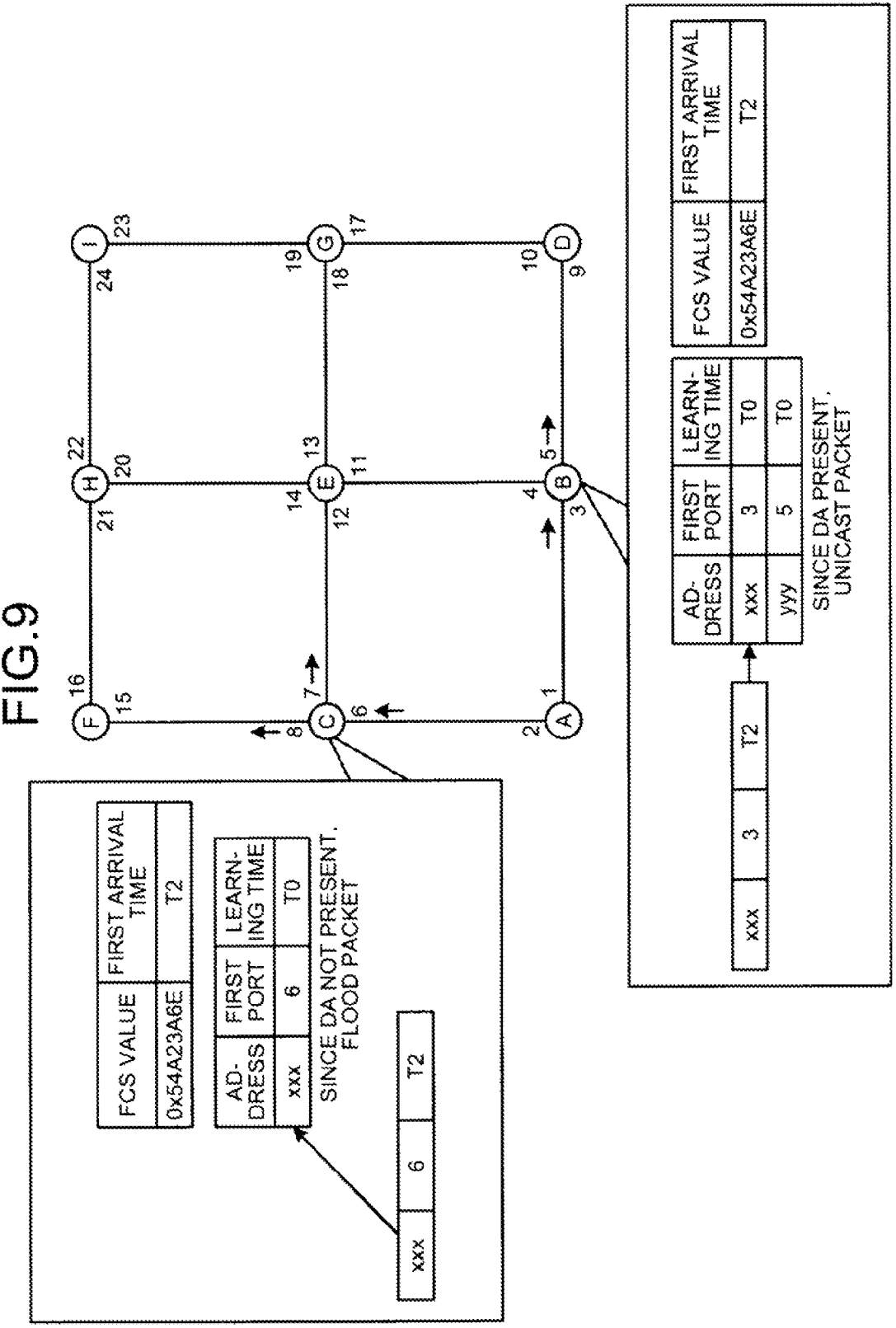

The packets transmitted in FIG. 8 are respectively received by the nodes 100 as depicted in FIG. 9. Node B, which has received the packet, stores packet information to the identity information table 302b, according to the conventional first-in, first-learned scheme and since SA "xxx" is stored in the MAC table 302a, restarts the aging timer. Further, since the first port number "5" corresponding to DA "yyy" is stored in the MAC table 302a, node B unicasts the packet from port number "5". The unicast packet traverses the shortest path toward DA "yyy".

Node C, which has received the packet, stores packet information to the identity information table 302b, according to the conventional first-in, first-learned scheme and since SA "xxx" is stored in the MAC table 302a, restarts the aging timer. Further, since the first port number corresponding to DA "yyy" is not stored in the MAC table 302a, node C floods the packet from all of the ports excluding the input port. As a result, in the network exclusive of the shortest path, the second best path proceeds to be generated.

Figure 10:
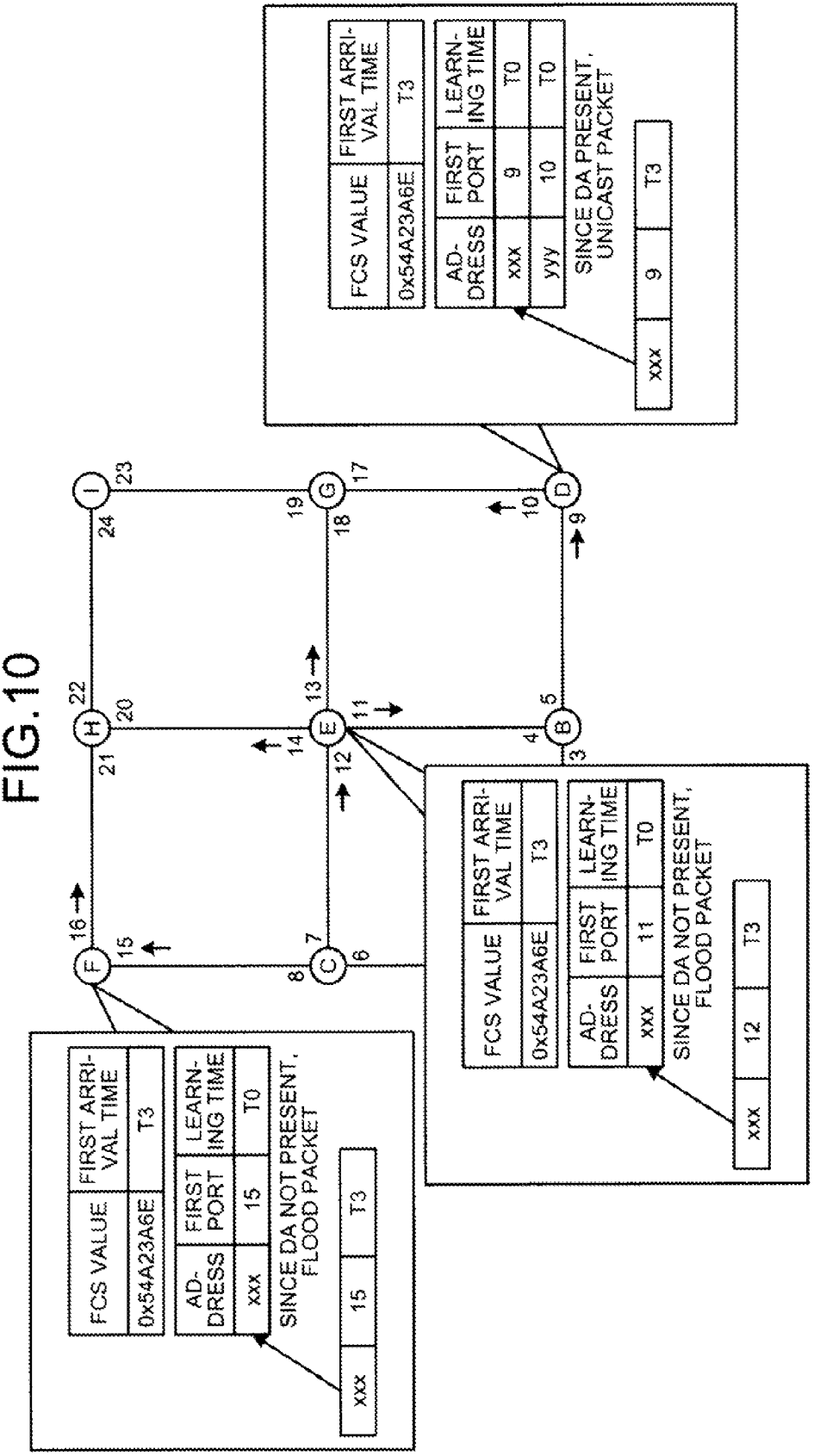

The packets transmitted in FIG. 9 are respectively received by the nodes 100 as depicted in FIG. 10. Node D, which has received the packet, stores packet information to the identity information table 302b, according to the conventional first-in, first-learned scheme and since SA "xxx" is stored in the MAC table 302a, restarts the aging timer. Further, since the first port number "10" corresponding to DA "yyy" is stored in the MAC table 302a, node D unicasts the packet from port number "10". The unicast packet traverses the shortest path toward DA "yyy".

Node E, which has received the packet, stores packet information to identity information table 302b, according to the conventional first-in, first-learned scheme; updates in the MAC table 302a, the port number "11", which corresponds to SA "xxx", to the port number "12", which received the packet; and restarts the aging timer. Further, since the first port number corresponding to DA "yyy" is not stored in the MAC table 302a, node E floods the packet from all of the ports excluding the input port. As a result, in the network exclusive of the shortest path, the second best path proceeds to be generated.

Node F, which has received the packet, stores packet information to the identity information table 302b, according to the conventional first-in, first-learned scheme and since SA "xxx" is stored in the MAC table 302a, restarts the aging timer. Further, since the first port number corresponding to DA "yyy" is not stored in the MAC table 302a, node F floods the packet from all of the ports excluding the input port. As a result, in the network exclusive of the shortest path, the second best path proceeds to be generated.

Figure 11:
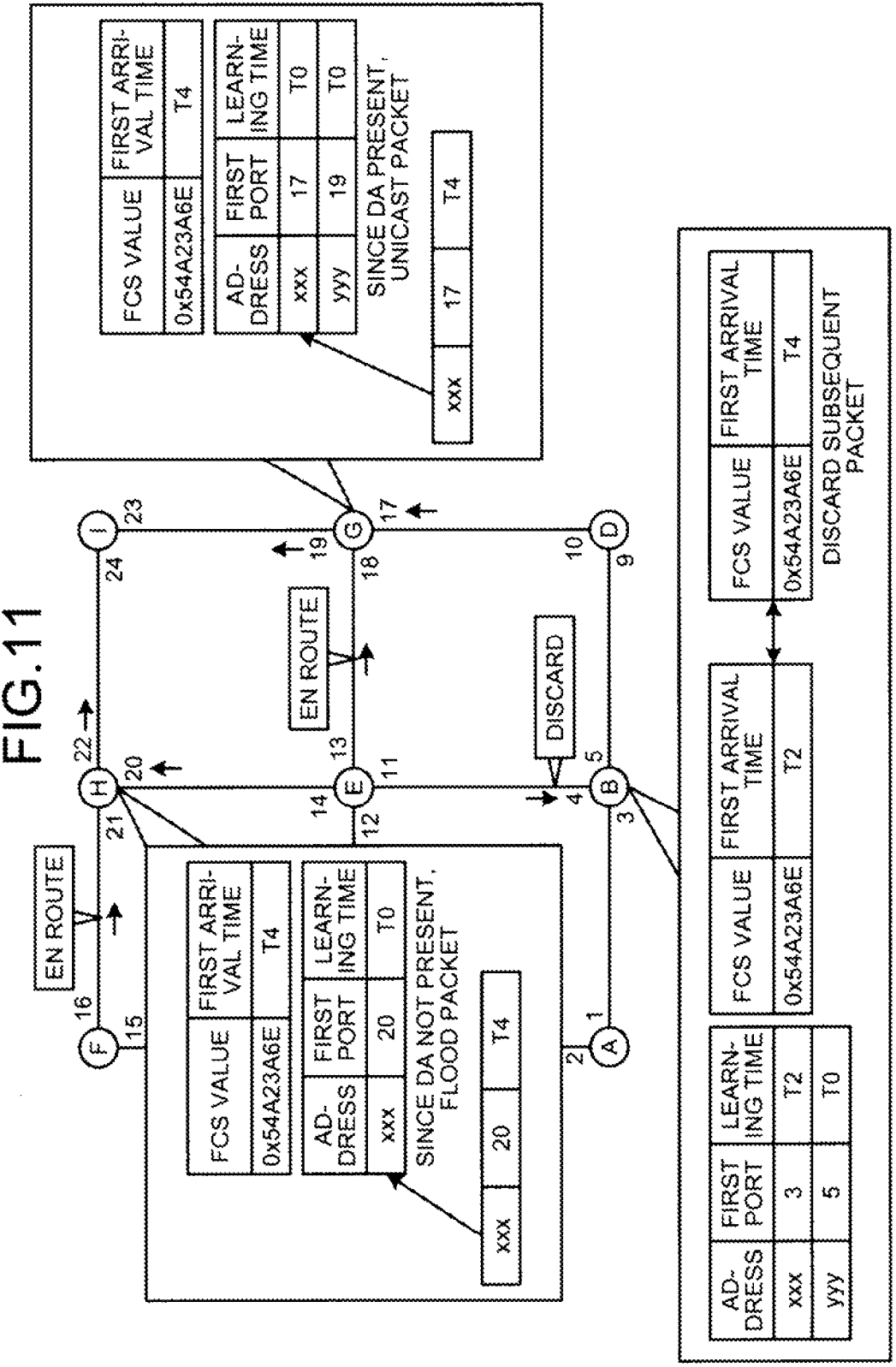

The packets transmitted in FIG. 10 are respectively received by the nodes 100 as depicted in FIG. 11. Node G, which has received the packet, stores packet information to the identity information table 302b, according to the conventional first-in, first-learned scheme and since SA "xxx" is stored in the MAC table 302a, restarts the aging timer. Further, since the first port number "19" corresponding to DA "yyy" is stored in the MAC table 302a, node G unicasts the packet from port number "19". The unicast packet traverses the shortest path toward DA "yyy".

Node H, which has received the packet, stores packet information to the identity information table 302b, according to the conventional first-in, first-learned scheme and since SA "xxx" is stored in the MAC table 302a, restarts the aging timer. Further, since the first port number corresponding to DA "yyy" is not stored in the MAC table 302a, node H floods the packet from all of the ports excluding the input port. As a result, in the network exclusive of the shortest path, the second best path proceeds to be generated.

Node B, which has received the packet from another port, judges according to the conventional first-in, first-learned scheme, that the packet information of the received packet has already been stored to the identity information table 302b. Here, since identical packet information is stored in the identity information table 302b, node B judges the received packet to be a subsequent packet and discards the packet. At this time, the MAC table 302a is not updated. As a result, paths sharing a node 100 with the shortest path are excluded from being the second best path.

Figure 12:
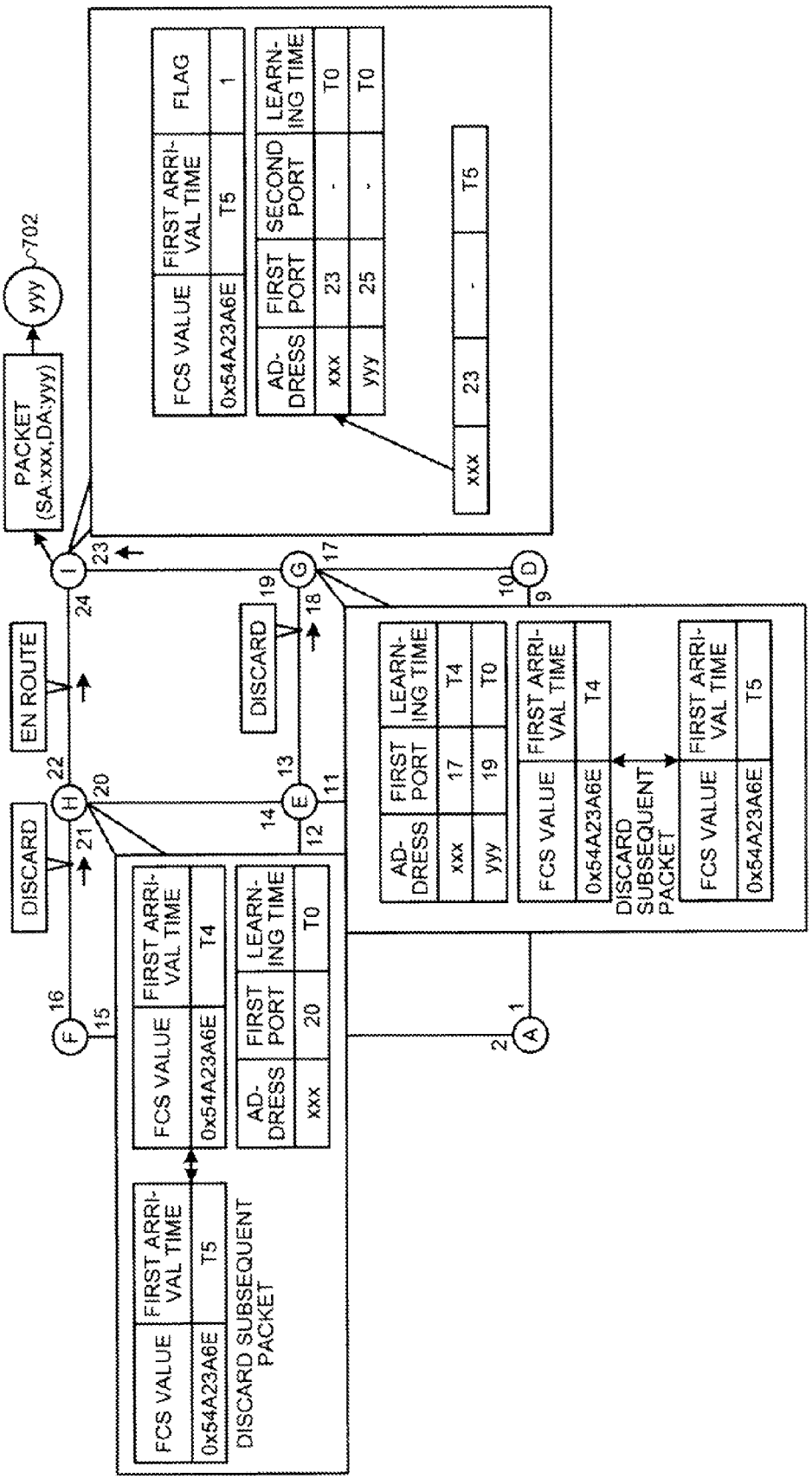

The packets transmitted in FIG. 11 are respectively received by the nodes 100 as depicted in FIG. 12. Node I, which has received the packet, stores packet information to the identity information table 302b, according to the egress node processes of the embodiment and since SA "xxx" is stored in the MAC table 302a, restarts the aging timer. Since first port number "25" corresponding to DA "yyy" is stored in the MAC table 302a, node I unicasts the packet from port number "25", whereby the packet is transmitted to DA "yyy".

Node G, which has received the packet from another port, judges according to the conventional first-in, first-learned scheme, that the packet information of the received packet has already been stored to the identity information table 302b. Here, since identical packet information is stored in the identity information table 302b, node G judges the received packet to be a subsequent packet and discards the packet. At this time, the MAC table 302a is not updated. As a result, paths sharing a node 100 with the shortest path are excluded from being the second best path.

Node H, which has received the packet from another port, judges according to the conventional first-in, first-learned scheme, that the packet information of the received packet has already been stored to the identity information table 302*b*. Here, since identical packet information is stored in the identity information table 302*b*, node H judges the received packet to be a subsequent packet and discards the packet. At this time, the MAC table 302*a* is not updated. As a result, in the network exclusive of the shortest path, paths having greater delay than other paths are excluded from being the second best path.

Figure 13:
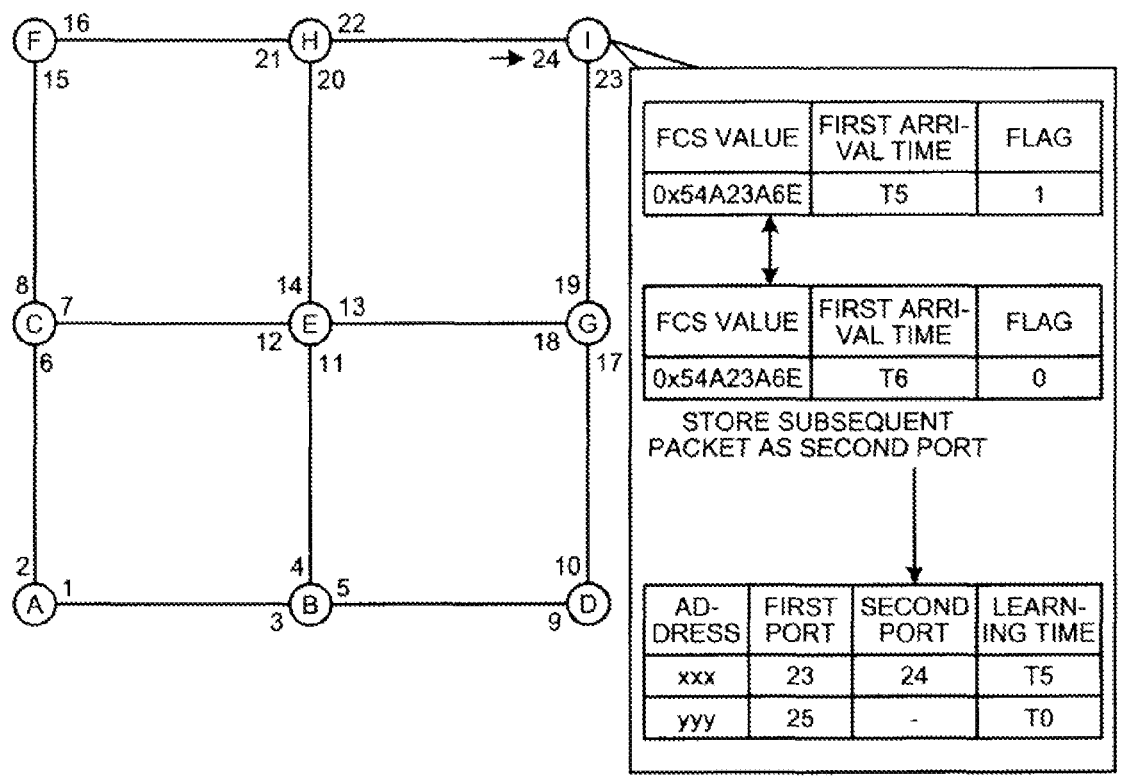

The packets transmitted in FIG. 12 are respectively received by the nodes 100 as depicted in FIG. 13. Node I, which has received the packet from another port, judges according to the egress node processes of the embodiment, that the packet information of the received packet has already been stored to the identity information table 302*b*. When identical packet information is stored in the identity information table 302*b*, node I judges based on the flag in the identity information table 302*b*, whether the received packet is the second packet.

In this example, node I judges the received packet to be the second packet and stores the port number of the port that received the packet, to the MAC table 302*a*, as the port number used in transmissions to the second best path. As a result, the port number for transmissions to the second best path, which shares no links or nodes with the shortest path, is stored to the MAC table 302*a*, and a unidirectional, second best path from SA "yyy" to DA "xxx" is generated. The third and subsequent packets are discarded based on the packet information and flags in the identity information table 302*b*, and the MAC table 302*a* is not updated.

Figure 14:
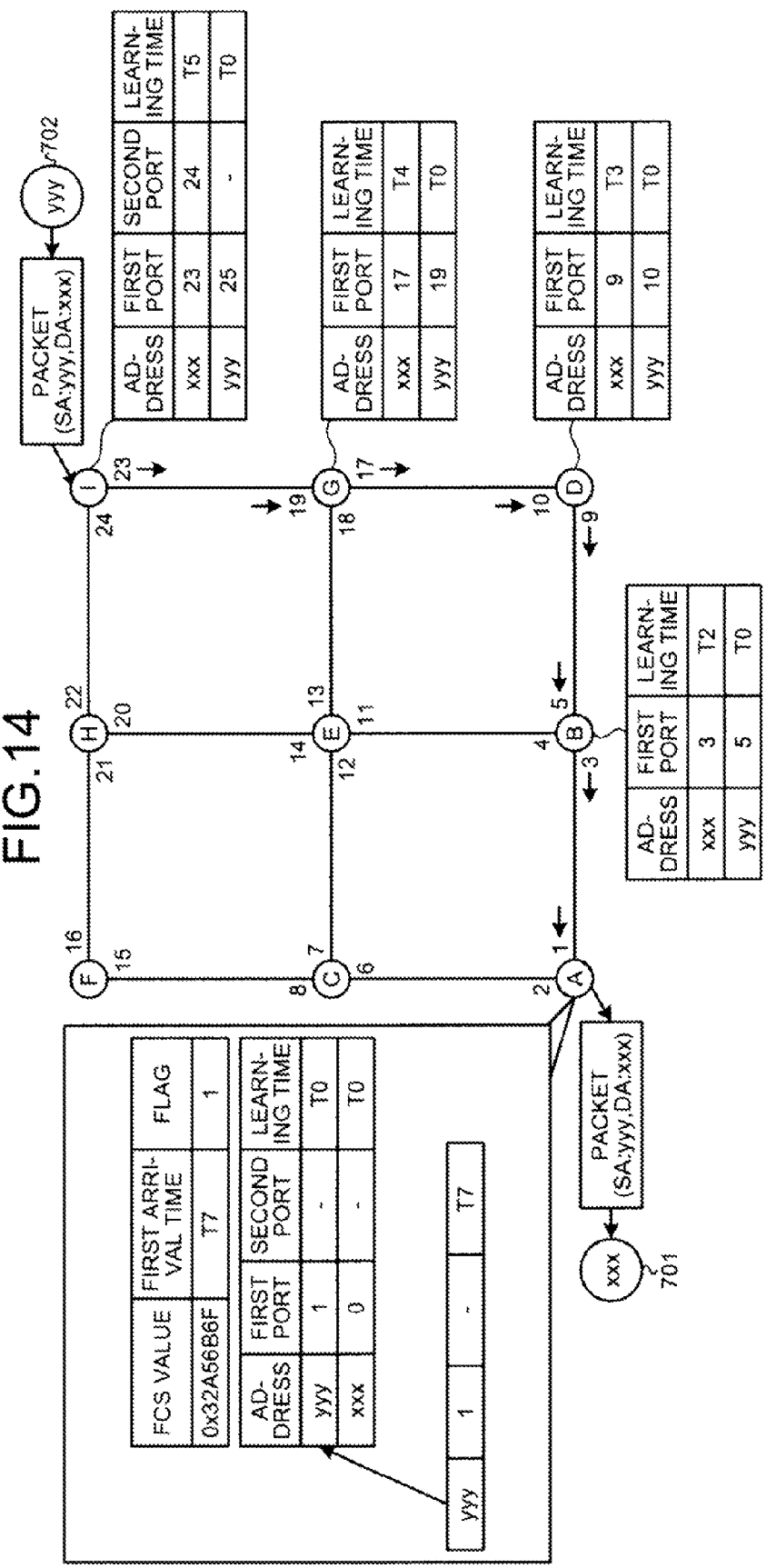

Next, as depicted in FIG. 14, a packet whose SA is "yyy" and DA is "xxx" is assumed to be transmitted to node I. Here, since the port number of the shortest path and the port number of the second best path are stored in the MAC table 302*a*, node I unicasts the packet from the respective ports, according to the egress node processes of the embodiment. Since each of the nodes 100 forming the shortest path store to the table, the port numbers used in transmitting packets to MAC address "xxx" and MAC address, packets can be transmitted to DA "xxx", based on the MAC table 302*a*.

Figure 15:
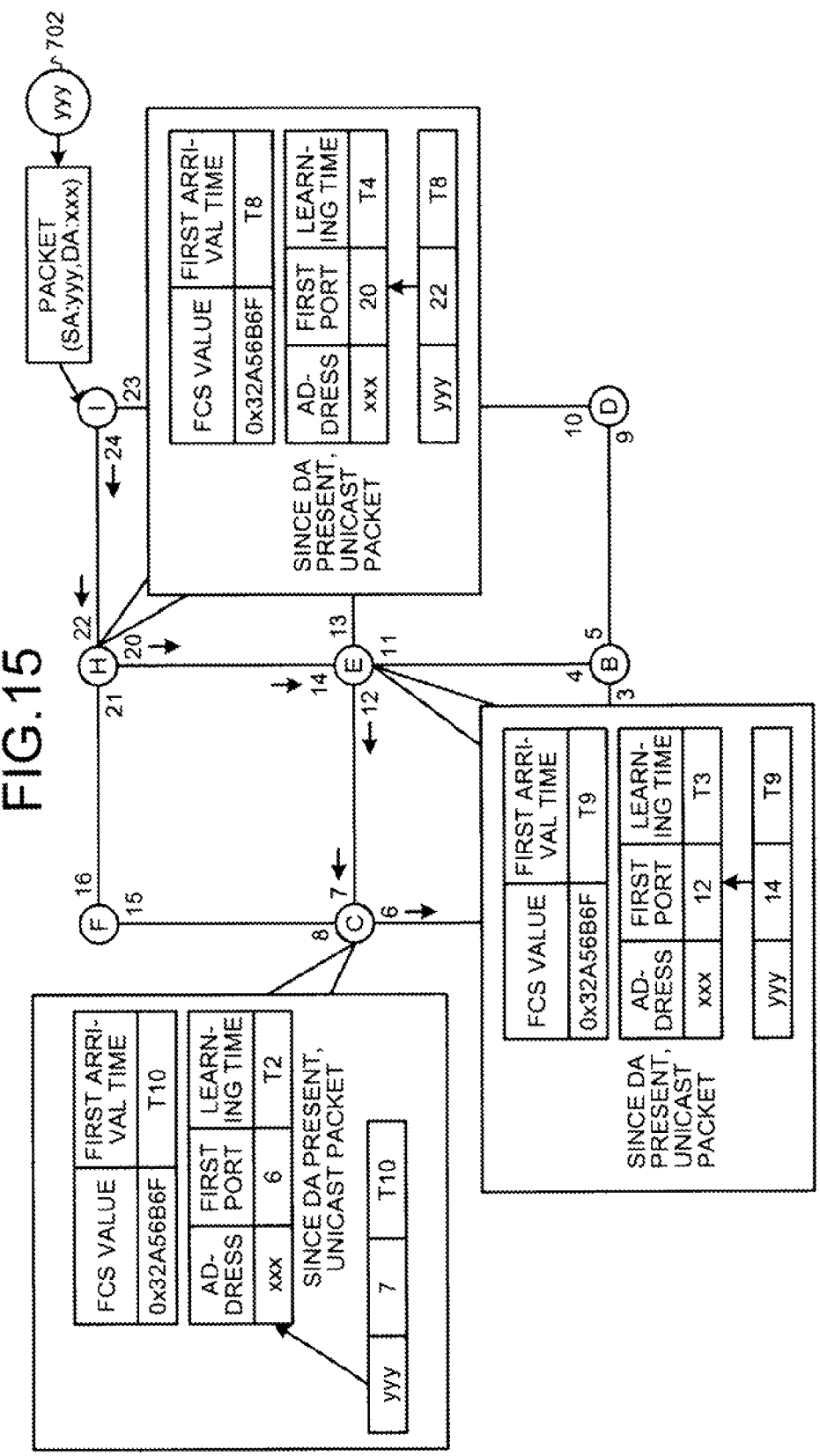

On the other hand, as depicted in FIG. 15, since the port numbers corresponding to DA "xxx" are stored in the MAC table 302*a*, each of the nodes 100 forming the second best path unicast the packet from the ports of the corresponding port numbers. Concurrently, the port numbers corresponding to SA "yyy" are stored to the MAC table 302*a*. As a result, packets traverse the second best path toward DA "xxx" and concurrently, the port numbers used in transmissions to DA "yyy" can be stored.

Figure 16:
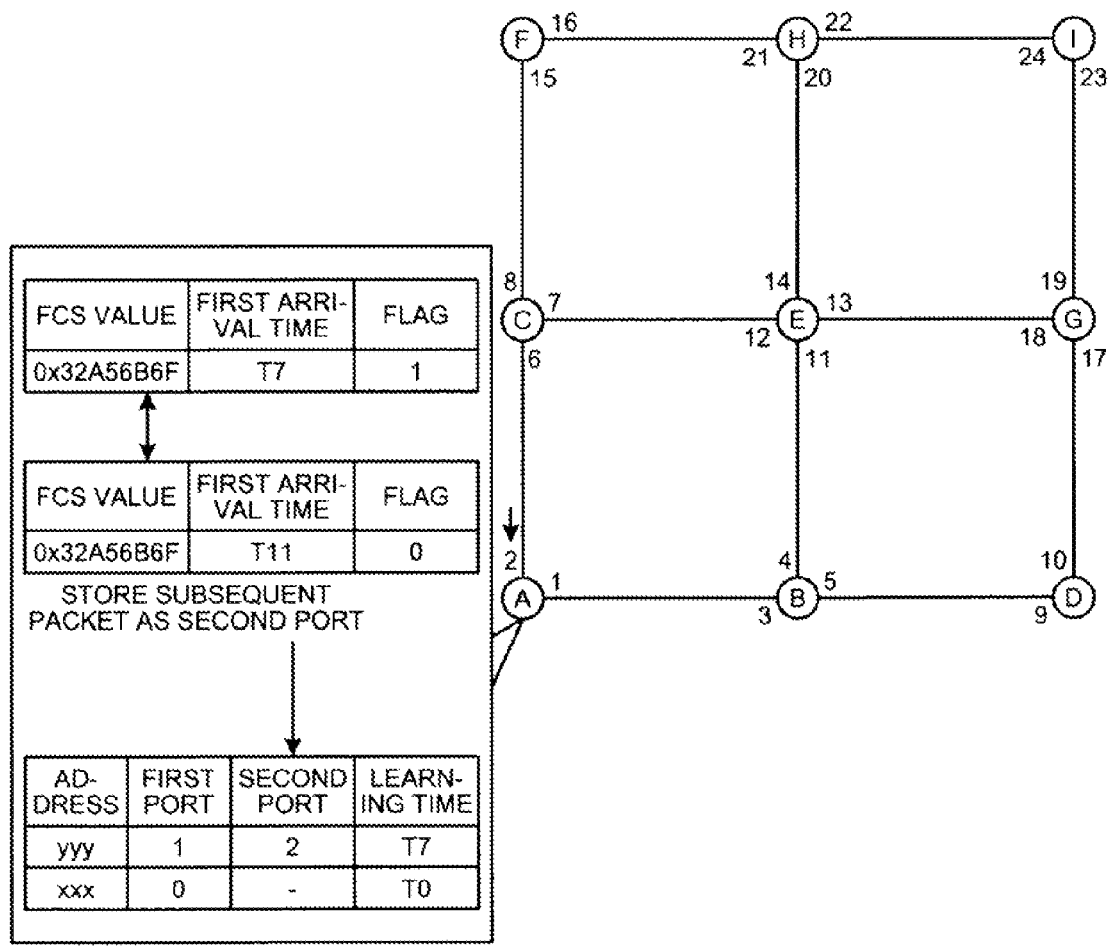

Further, as depicted in FIG. 16, node A, which has received the packet from another port, judges according to the ingress node processes of the embodiment, that the packet information of the received packet has already been stored to the identity information table 302*b*. When identical packet information is stored in the identity information table 302*b*, node A judges based on the flags in the identity information table 302*b*, whether the received packet is the second packet.

In this example, node A judges the received packet to be the second packet and stores the port number of the port that received that packet, to the MAC table 302*a*, as the port number used in transmission to the second best path. The received packet is discarded. As a result, the port number for transmissions to the second best path, which shares no links or nodes with the shortest path, is stored to the MAC table 302*a*, and a bidirectional, second best path from SA "xxx" to DA "yyy" is generated. The third and subsequent packets are discarded based on the packet information and flags in the identity information table 302*b*, and the MAC table 302*a* is not updated.

Thus, after the second best path is generated, the ingress node according to the embodiment, upon receiving a packet, transmits the packet to the shortest path and the second best path, respectively. Further, the egress node according to the embodiment receives the first packet from either the shortest path or the second best path, to DA "yyy" and discards subsequent packets.

Figure 17:
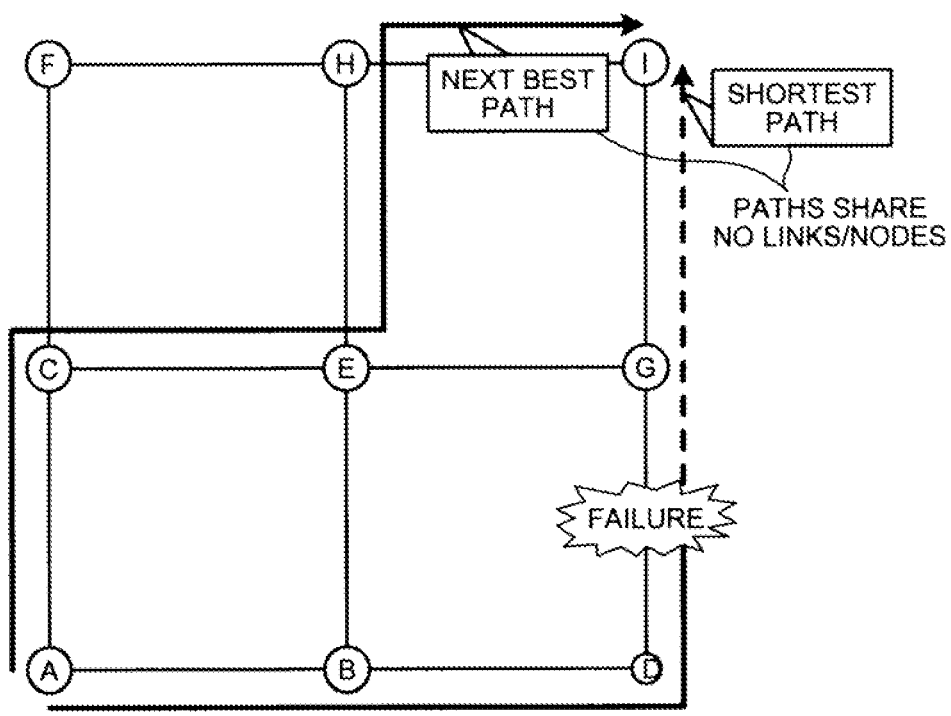

Thus, as depicted in FIG. 17, even if failure occurs at a link forming the shortest path, the packet can be received from the second best path and redundancy can be established in the network without interruption or packet loss. Similarly, when one of the paths suffers large delays consequent to queuing delays, the packet can be received from the other path without delays. Since the second best path performs processes according to a conventional first-in, first-learned scheme at nodes 100 other than the ingress node and egress node, the operator is able to automatically achieve network redundancy by merely performing settings for the ingress node and the egress node. Therefore, operating costs can be reduced.

Figure 18:
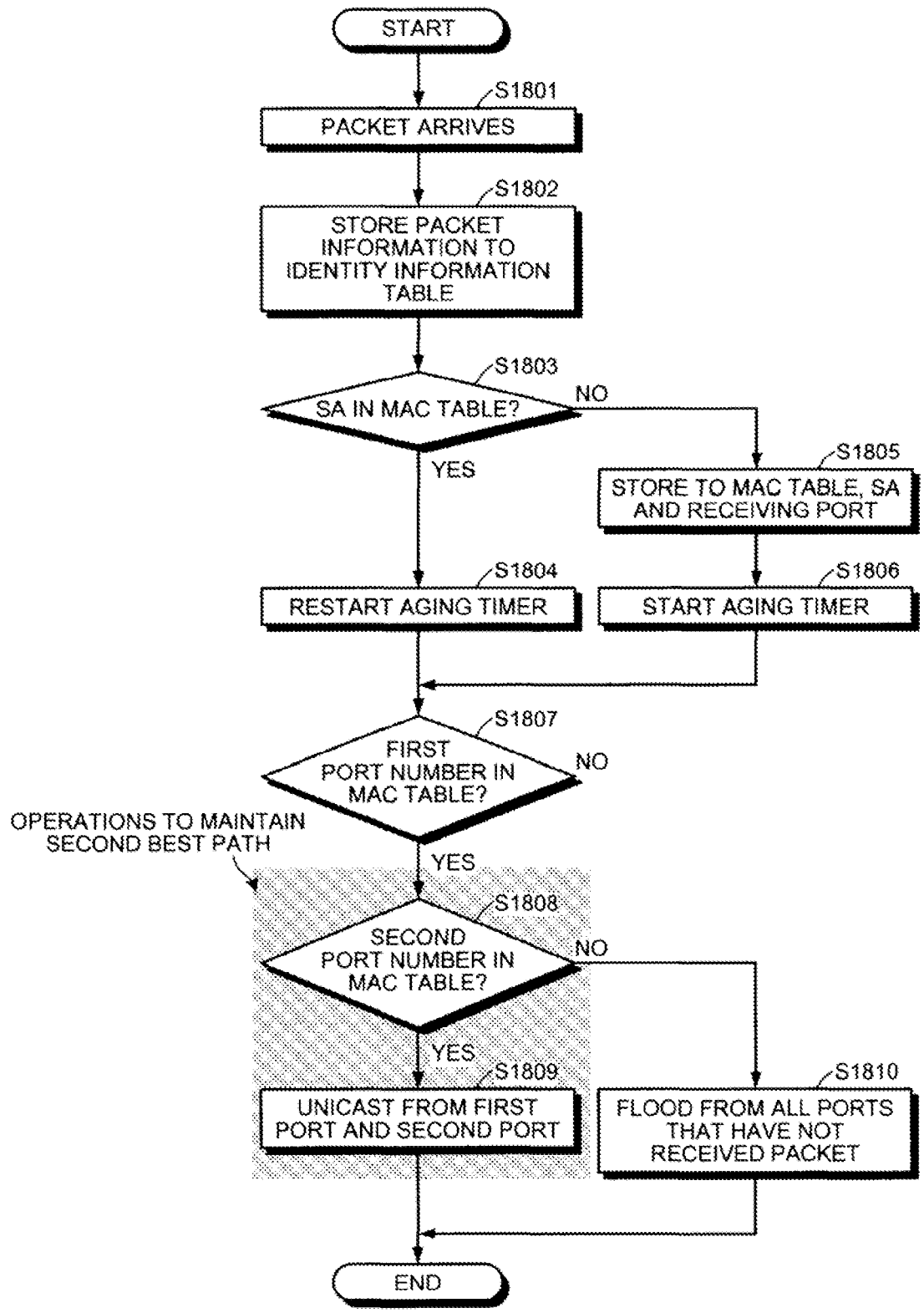
FIG. 18 is a flowchart of path generation processes of an ingress node.

FIG. 18 is a flowchart of path generation processes of the ingress node.

As depicted in FIG. 18, the packet processor 602, upon the arrival of a packet (step S1801), stores packet information (FCS value) to the identity information table 302*b* (step S1802).

The packet processor 602 judges whether an address identical to the SA (transmission source MAC address) in the packet is included in the MAC table 302*a* (step S1803). When an identical address is included (step S1803: YES), the packet processor 602 restarts aging timer (step S1804). On the other hand, when an identical address is not included (step S1803: NO), the packet processor 602 stores to the MAC table 302*a*, the SA and the port number of the port that received the packet (hereinafter, "receiving port") (step S1805), and starts the aging timer (step S1806).

The packet processor 602 judges whether the port number (hereinafter, "first port number") of the first port field corresponding to the DA (destination MAC address) in the packet is included in the MAC table 302*a* (step S1807). When the first port number is included (step S1807: YES), the packet processor 602 judges whether the port number (hereinafter, "second port number") of the second port field corresponding to the DA (destination MAC address) in the packet is included in the MAC table 302*a* (step S1808).

When the second port number is included (step S1808: YES), the packet processor 602 performs unicast transmission from 2 ports, the port (hereinafter, "first port") of the first port number and the port (hereinafter, "second port") of the second port number, respectively specified in the table (step S1809), thereby ending the processes.

When the first port number is not included (step S1807: NO), or when the second port number is not included (step S1808: NO), the packet processor 602 floods the packet from all of the port that have not received the packet (step S1810), thereby ending the processes. Here, if the ports have been grouped by, for example, a network unit such as VLAN, the packet processor 602 performs flooding with respect to only the ports belonging to the same group as the receiving port. In other words, when the first port number is not included (step S1807: NO) or when the second port number is not included (step S1808: NO), the packet processor 602 performs flooding from all of the ports of the broadcast domain, among the ports that did not receive the packet.

Here, although it is assumed that the packets from the shortest path will surely arrive first at each of the nodes 100, delays in the arrival of packets from the shortest path, consequent to queuing delays are also considered. In this case as well, to ensure that packets from the shortest path arrive first, the path generation processes depicted in FIG. 18 maybe amended to the path generation processes depicted in FIG. 19.

Figure 19:
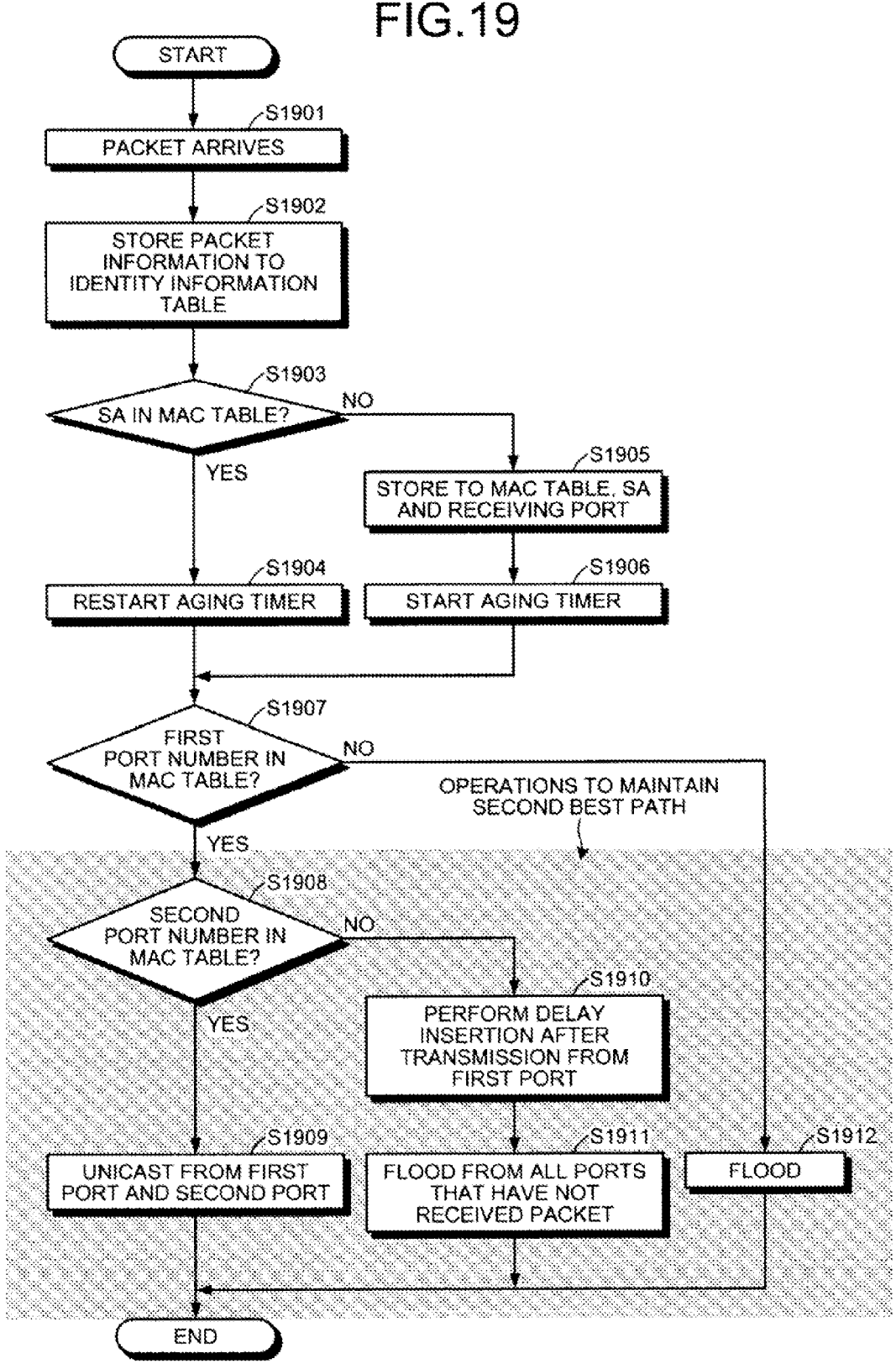
FIG. 19 is a flowchart of path generation processes for inserting ingress node delays.

FIG. 19 is a flowchart of path generation processes for inserting ingress node delays. As depicted in FIG. 19, the packet processor 602, upon the arrival of a packet (step S1901), stores packet information to the identity information table 302b (step S1902).

The packet processor 602 judges whether an address identical to the SA in the packet is included in the MAC table 302a (step S1903). When an identical address is included (step S1903: YES), the packet processor 602 restarts the aging timer (step S1904). When an identical address is not included (step S1903: NO), the packet processor 602 stores the SA and the receiving port to the MAC table 302a (step S1905), and starts the aging timer (step S1906).

The packet processor 602 judges whether the first port number corresponding to the DA in the packet is included in the MAC table 302a (step S1907). When the first port number is included (step S1907: YES), the packet processor 602 judges whether the second port number corresponding to the DA in the packet is included in the MAC table 302a (step S1908).

When the second port number is included (step S1908: YES), the packet processor 602 performs unicast transmission from 2 ports, the first port and the second port respectively specified in the table (step S1909), thereby ending the processes.

When the second port number is not included (step S1908: NO), the packet processor 602 performs transmission from the first port specified in the table and after a given period elapses (delay insertion), proceeds to step S1911 (step S1910). The packet processor 602 performs flooding from all of the ports that are not the first port and have not received the packet (step S1911), thereby ending the processes.

When the first port number is not included (step S1907: NO), the packet processor 602 performs flooding from all of the ports that have not received the packet (step S1912), thereby ending processes. Here, if the ports have been grouped by, for example. a network unit such as VLAN, the packet processor 602 performs flooding with respect to only the ports belonging to the same group as the receiving port. In other words, when the first port number is not included (step S1907: NO), or the second port number is not included (step S1908: NO), the packet processor 602 performs flooding from all of the ports of the broadcast domain, among the ports that did not receive the packet.

FIG. 20 is a flowchart of path generation processes of the egress node.

As depicted in FIG. 20, the packet processor 602, upon the arrival of a packet (step S2001), judges whether identical information is included in the identity information table 302b (step S2002). When identical information is not included in the identity information table 302b (step S2002: NO), the packet processor 602 stores packet information related to the packet at step S2001 to the identity information table 302b and sets the flag to 1 (step S2003).

The packet processor 602 judges whether an address identical to the SA in the packet is included in the MAC table 302a (step S2004). When an identical address is included (step S2004: YES), the packet processor 602 restarts the aging timer (step S2005). When an identical address is not included (step S2004: NO), the packet processor 602 stores the SA and the receiving port to the MAC table 302a (step S2006), and starts the aging timer (step S2007).

The packet processor 602 judges whether the first port number corresponding to the DA in the packet is included in the MAC table 302a (step S2008). When the first port number is included (step S2008: YES), the packet processor 602 performs unicast transmission from the port specified in the table (step S2009), thereby ending the processes. On the other hand, when the first port number is not included (step S2008: NO), the packet processor 602 performs flooding from all of the ports that have not received the packet (step S2010), thereby ending the processes.

Here, if the ports have been grouped by, for example, a network unit such as VLAN, the packet processor 602 performs flooding with respect to only the ports belonging to the same group as the receiving port. In other words, when the DA is not included (step S2008: NO), the packet processor 602 performs flooding from all of the ports of the broadcast domain, among the ports that did not receive the packet.

Further, at step S2002, if the packet processor 602 judges that identical information is in the identity information table 302b (step S2002: YES), the packet processor 602 judges whether the flag in the identity information table 302b is 1 (step S2011). If the flag is not 1 (step S2011: NO), the packet processor 602 proceeds to step S2014. If the flag is 1 (step S2011: YES), the packet processor 602 stores to the MAC table 302a, the SA and the receiving port (step S2012), and sets the flag to 0 (step S2013). The packet processor 602 discards the packet (step S2014), thereby ending the processes.

Thus, in the embodiment, a terminal node 100 of the shortest path performs flooding from all of the ports excluding the port that received the packet. As a result, the nodes 100 forming the network can automatically learn a return path of the second best path, which shares no links or nodes with the shortest path. Furthermore, the other terminal node 100 of the shortest path can learn the shortest path and the second best path.

Further in the embodiment, in generating the second best path and after a given period elapses from the transmission of the packet from the port of the shortest path, a terminal node 100 of the shortest path performs flooding from all of the ports excluding the receiving port and the port to the shortest path. Consequently, even if queuing delay occurs in the shortest path, the second best path can be learned.

Thus, upon the arrival of a packet, the other terminal node 100 that has learned the second best path transmits the packet to the shortest path and the second best path, respectively. Consequently, the nodes 100 on the return path of the second best path can automatically learn the return path of the second best path, whereby a bidirectional, second best path can be learned by the terminal nodes of the shortest path.

One of the terminal nodes that has learned the bidirectional, second best path transmits a packet to the shortest path and the second best path, respectively. The other terminal node that has learned the bidirectional, second best path transmits the first packet, irrespective of whether the packet is from the shortest path or the second best path, to the destination MAC address in the packet and discards subsequent packets. Consequently, even if failure occurs along either one of the paths, the packet can be received from the other path, enabling recovery of the failure, without interruption or packet loss.

Similarly, when one of the paths suffers great delay consequent to queuing delays, the other terminal node 100 that has learned the bidirectional, second best path can receive the packet from the other path.

Concerning the second best path, since processes are performed according to the conventional first-in, first-learned scheme at nodes 100 excluding the terminal nodes 100 of the shortest path, the operator is able to automatically achieve network redundancy by merely performing settings for the terminal nodes 100 of the shortest path.

Therefore, reductions in design workloads of the operator are facilitated. Further, since the second best path is automatically generated, irrespective of the path design skill level of the operator, the second best path can be easily generated. In addition, since the second best path is automatically generated, the second best path can be quickly set.

Even when failure occurs on either the shortest path or the second best path, the path on which failure has not occurred is regarded as the generated shortest path, and by performing the second best path generation of the embodiment, the period during which there is only 1 path can be reduced, thereby facilitating improved network stability. Further, although the identification of the location of a failure and the recovery of the failure consumes time, when a failure occurs, the second best path can be generated quickly, whereby a state in which there are 2 paths can be quickly recovered and therefore, time can be spent on locating and recovery of the failure.

In the embodiment, for simplicity, the node 100 has been described as the ingress node or the egress node. Nonetheless, in practice, the node 100 has the functions of both the ingress node and the egress node. Therefore, in practice, the operator sets each of the ports of the node 100 to belong ingress or egress.

According to the embodiment, an alternative path that shares no links or nodes with the active path can be generated.

The path generating method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A path generating method comprising:
   a first operation by a first terminal relay device and of transmitting an outbound packet from a given port among ports of a first terminal relay device of a path that is from a first device to a second device and flooding the outbound packet from the ports excluding the given port and a receiving port, wherein the first terminal relay device is among relay devices forming a network in which the path is set according to a first-in, first-learned scheme, the given port is a port specified by the first-in, first-learned scheme, the receiving port is the port that has received the outbound packet, which is a packet whose source is the first device and whose destination is the second device;
   a second operation of learning and flooding by a relay device that is among the relay devices and not on the path, wherein the relay device learns according to the first-in, first-learned scheme, the source of a first-arriving outbound packet that is first to arrive among the outbound packets flooded to the relay device and further learns the port number of the receiving port that received the first-arriving outbound packet, and floods the outbound packet from the ports excluding the receiving port; and
   a third operation of transmitting and learning by a second terminal relay device that is on the path and among the relay devices, wherein from a port of a port number of the second relay device learned according to the first-in, first-learned scheme, the second terminal relay device transmits to the second device, the outbound packet received from a relay device on the path and learns the source of the first-arriving outbound packet among the outbound packets flooded to the second terminal relay device and further learns the port number of the receiving port that received the first-arriving outbound packet.

2. The path generating method according to claim 1, wherein
   the first operation includes flooding of the outbound packet by the first terminal relay device after a given period has elapsed since transmission of the outbound packet from the given port by the first terminal relay device.

3. The path generating method according to claim 1, further comprising:
   a fourth operation of transmitting a return packet whose source is the second device and whose destination is the first device by the second terminal relay device, wherein the second terminal relay device transmits the return packet from a first port learned before the third operation and a second port learned at the third operation, the first and the second ports being learned according to the first-in, first-learned scheme;
   a fifth operation of learning and transmitting by the relay device that is among the relay devices and not on the path, wherein when the return packet transmitted at the fourth operation is received, the relay device learns according to the first-in, first-learned scheme, the source of the return packet and the port number of the receiving port that received the return packet, and transmits the return packet from the port of the port number corresponding to the source of the outbound packet; and
   a sixth operation of transmitting to the first device, the return packet received by the given port and learning by the first terminal relay device, wherein the first terminal relay device transmits the return packet from the port of the port number corresponding to the first device as a destination and learned according to the first-in, first-learned scheme, and learns the source of the return packet received from a port other than the given port and further learns the port number of the port that received the return packet.

4. The path generating method according to claim 3, further comprising:
   a seventh operation of transmitting by the second terminal relay device, wherein after the sixth operation and upon receiving respectively by the first port and the second port, a new packet whose source is the first device and whose destination is the second device, the second terminal relay device transmits to the second device, only the new packet that is first to arrive among the new packets respectively received by the first port and the second port.

5. A relay device comprising:
a receiver that receives a packet;
a first processor that when a packet is received by the receiver, judges whether a given port number corresponding to a destination in the packet is included in a table storing the port numbers of ports corresponding to each destination; and
a transmitter that when the first processor judges that the given port number is stored in the table, transmits the packet from the port of the given port number, and after a given period has elapse since transmission of the packet from the port of the given port number, simultaneously transmits the packet from the ports of the relay device excluding the given port and the port that received the packet.

6. The relay device according to claim 5, further comprising:
an second processor that when a series of packets are received by the receiver, judges whether among the series of packets, a first packet and a subsequent packet that is received by a port other than the port that received the first packet are identical; and
a table controller that correlates and stores to the table, the port number of the port that received the subsequent packet judged to be identical by the second processor and the source of the subsequent packet, the source to become a destination.

7. A relay device comprising:
a receiver that receives a series of packets;
an second processor that judges among the series of packets, whether a first packet and a subsequent packet that is received by a port other than the port that received the first packet are identical;
a third processor that judges whether the subsequent packet is a second packet after the first packet; and
a table controller that correlates and stores to a table that stores port numbers of ports corresponding to each destination, the port number of the port that received the subsequent packet judged to be identical by the second processor and judged to be the second packet by the third processor, and the source of the subsequent packet judged to be the second packet, the source to become a destination.

8. The relay device according to claim 7, further comprising:
a transmitter that based on the table, transmits respectively from the port that received the first packet and the port that received the subsequent packet judged to be the second packet, a packet whose destination is the source of the first packet and of the subsequent packet judged to be the second packet.

9. The relay device according to claim 8, wherein
the transmitter, when a packet whose source is a destination stored in the table, is received by two ports corresponding to the destination, transmits among the packets received by the two ports, only the first packet.

10. A non-transitory, computer-readable medium storing therein a path generating program that causes a computer to execute a process comprising:
receiving a packet;
judging, when a packet is received at the receiving, whether a given port number corresponding to a destination in the packet is included in a table storing the port numbers of ports corresponding to each destination; and
transmitting, when the given port number is judged to be stored in the table at the judging, the packet from the port of the given port number, and after a given period has elapsed since transmission of the packet from the port of the given port number, simultaneously transmitting the packet from the ports of the relay device excluding the given port and the port that received the packet.

11. The non-transitory, computer-readable medium according to claim 10, the process further comprising:
judging, when a series of packets are received at the receiving, whether among the series of packets, a first packet and a subsequent packet that is received by a port other than the port that received the first packet are identical; and
correlating and storing to the table, the port number of the port that received the subsequent packet judged to be identical at the judging and the source of the subsequent packet, the source to become a destination.

12. A non-transitory, computer-readable medium storing therein a path generating program that causes a computer to execute a process comprising:
receiving a series of packets;
judging among the series of packets, whether a first packet and a subsequent packet that is received by a port other than the port that received the first packet are identical;
judging whether the subsequent packet is a second packet after the first packet; and
correlating and storing to a table that stores port numbers of ports corresponding to each destination, the port number of the port that received the subsequent packet judged to be identical and judged to be the second packet, and the source of the subsequent packet judged to be the second packet, the source to become a destination.

13. The non-transitory, computer-readable medium according to claim 12, further comprising:
transmitting based on the table and respectively from the port that received the first packet and the port that received the subsequent packet judged to be the second packet, a packet whose destination is the source of the first packet and of the subsequent packet judged to be second packet.

14. The non-transitory, computer-readable medium according to claim 13, wherein
the transmitting includes, when a packet whose source is a destination stored in the table, is received by two ports corresponding to the destination, transmitting among the packets received by the two ports, only the first packet.

15. A path generating method executed by a computer, the method comprising:
receiving a packet;
judging, when a packet is received at the receiving, whether a given port number corresponding to a destination in the packet is included in a table storing the port numbers of ports corresponding to each destination; and
transmitting, when the given port number is judged to be stored in the table at the judging, the packet from the port of the given port number, and after a given period has elapsed since transmission of the packet from the port of the given port number, simultaneously transmitting the packet from the ports of the relay device excluding the given port and the port that received the packet.

16. The path generating method according to claim 15, further comprising:
judging, when a series of packets are received at the receiving, whether among the series of packets, a first packet and a subsequent packet that is received by a port other than the port that received the first packet are identical; and correlating and storing to the table, the port number of the port that received the subsequent packet judged to be identical at the judging and the source of the subsequent packet, the source to become a destination.

17. A path generating method executed by a computer, the method comprising:

receiving a series of packets;

judging among the series of packets, whether a first packet and a subsequent packet that is received by a port other than the port that received the first packet are identical;

judging whether the subsequent packet is a second packet after the first packet; and correlating and storing to a table that stores port numbers of ports corresponding to each destination, the port number of the port that received the subsequent packet judged to be identical and judged to be the second packet, and the source of the subsequent packet judged to be the second packet, the source to become a destination.

18. The path generating method according to claim 17, further comprising:

transmitting based on the table and respectively from the port that received the first packet and the port that received the subsequent packet judged to be the second packet, a packet whose destination is the source of the first packet and of the subsequent packet judged to be second packet.

19. The path generating method according to claim 18, wherein the transmitting includes, when a packet whose source is a destination stored in the table, is received by two ports corresponding to the destination, transmitting among the packets received by the two ports, only the first packet.

* * * * *